(12) United States Patent
Chujo

(10) Patent No.: US 6,567,058 B1
(45) Date of Patent: *May 20, 2003

(54) DIGITAL CONVERGENCE CORRECTION DEVICE AND DISPLAY DEVICE

(75) Inventor: Takeshi Chujo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/536,382

(22) Filed: Mar. 28, 2000

Related U.S. Application Data

(63) Continuation of application No. PCT/JP97/03647, filed on Oct. 9, 1997.

(51) Int. Cl.[7] .............................................. H04N 13/04
(52) U.S. Cl. .......................... 345/55; 345/12; 345/13; 345/20; 345/56; 345/81; 348/728; 348/806; 348/807; 315/368.11; 315/368.12
(58) Field of Search .............................. 345/55, 56, 81, 345/12, 13, 20; 348/806, 807, 728; 315/368.11, 368.12

(56) References Cited

U.S. PATENT DOCUMENTS 5,272,421 A * 12/1993 Kimura et al. ......... 315/368.12
5,382,984 A * 1/1995 Tsujihara et al. ........... 346/746
5,734,233 A * 3/1998 Masumoto et al. ..... 315/368.12
5,969,655 A * 10/1999 Imai ............................ 341/144
6,128,048 A * 10/2000 Cho ............................ 348/745
6,288,758 B1 * 9/2001 Chujo ......................... 348/807

FOREIGN PATENT DOCUMENTS

| JP | A60 33791 | 2/1985 |
| JP | 61-12191 | 1/1986 |
| JP | 0720809 | 1/1995 |
| KR | 61-12191 | 1/1986 |
| KR | 95-30640 | 11/1995 |

* cited by examiner

Primary Examiner—Richard Hjerpe
Assistant Examiner—Abbas Abdulselam
(74) Attorney, Agent, or Firm—Birch, Stewart, Kolasch & Birch, LLP

(57) ABSTRACT

A problem to be solved by the invention is to prevent a digital convergence correction device from lowering in precision of correction performed when a relation between screen raster and effective area of picture varies.

A vertical display area detection signal that corresponds to a position in vertical direction of a picture display area on a screen is generated in accordance with a vertical deflecting current. An address counter for generating an address for reading out correction data is controlled in accordance with the signal.

20 Claims, 39 Drawing Sheets

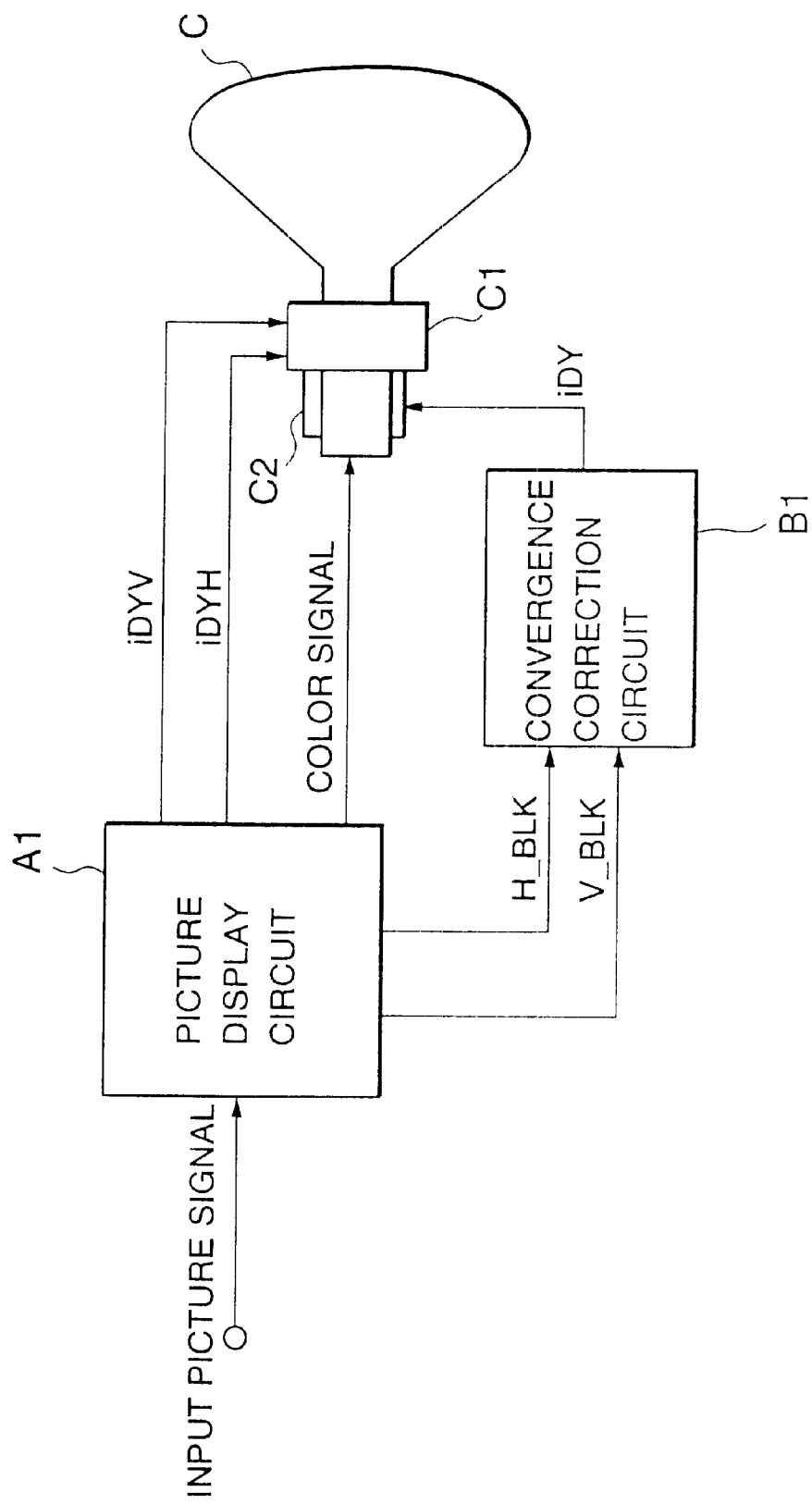

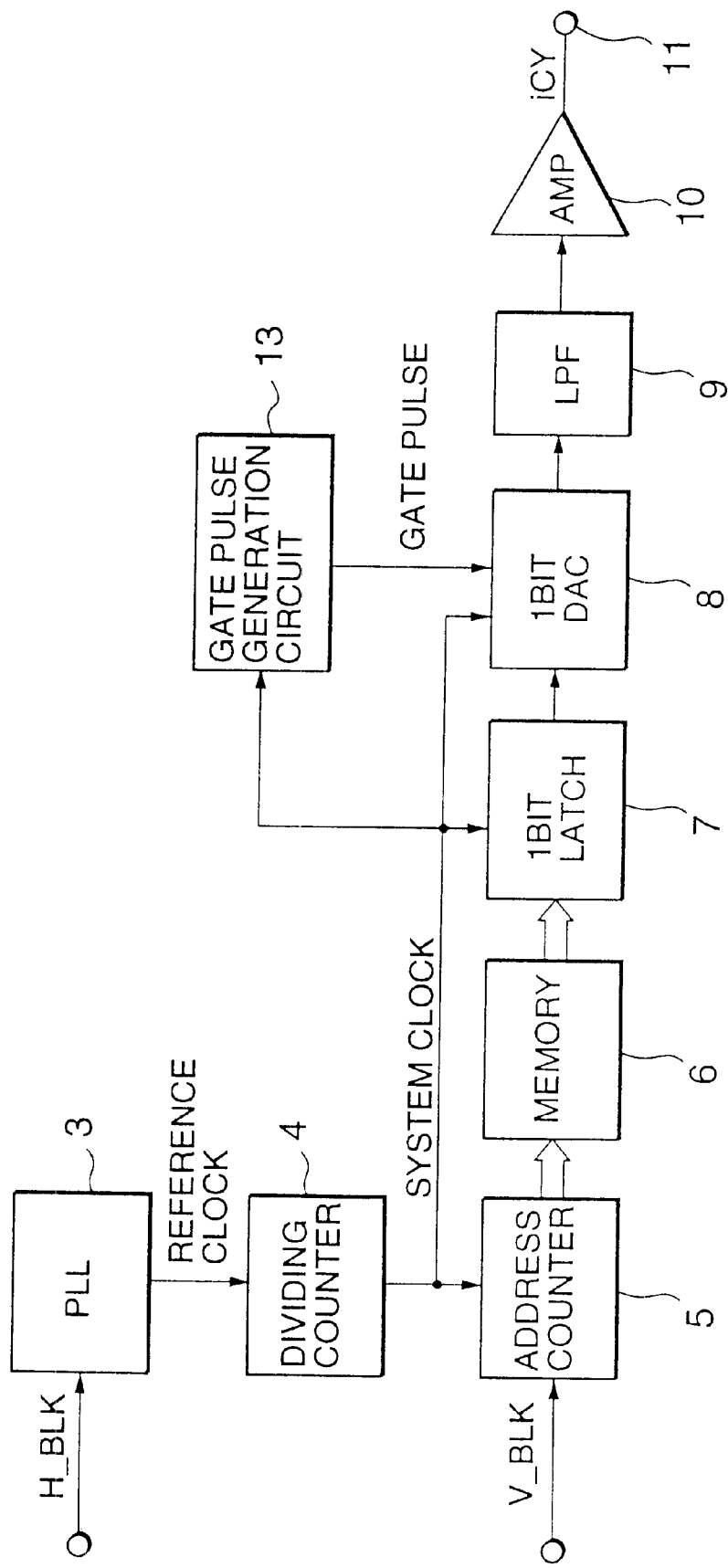

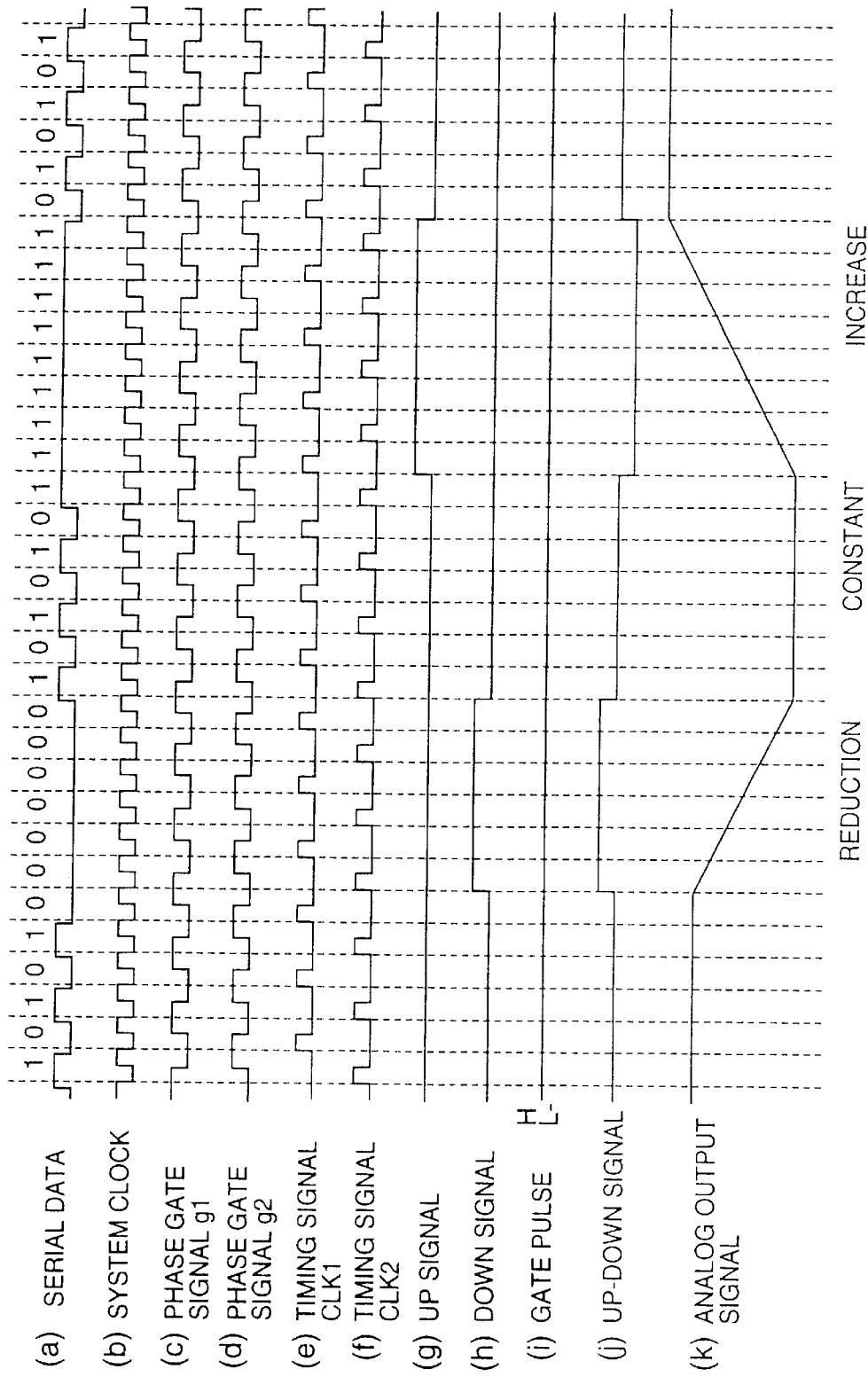

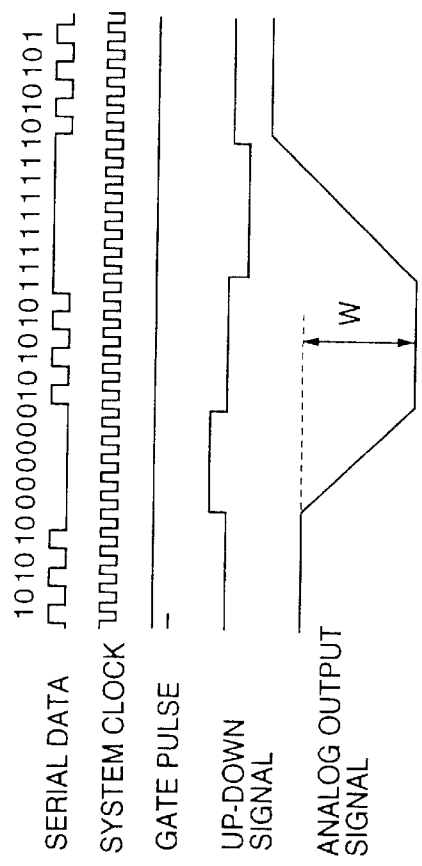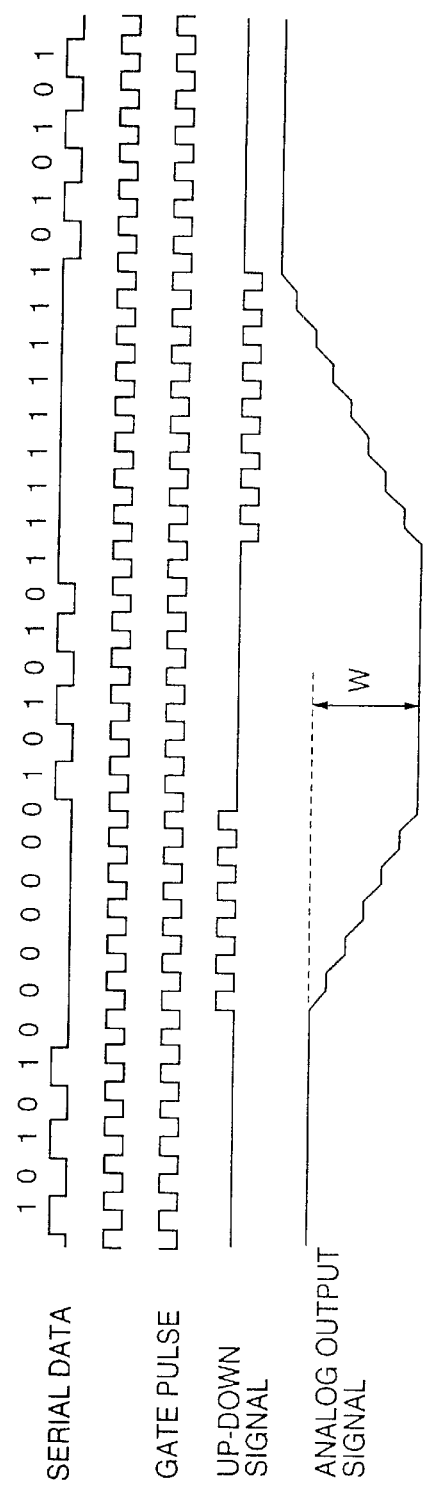
Fig.6(a)
Fig.6(b)

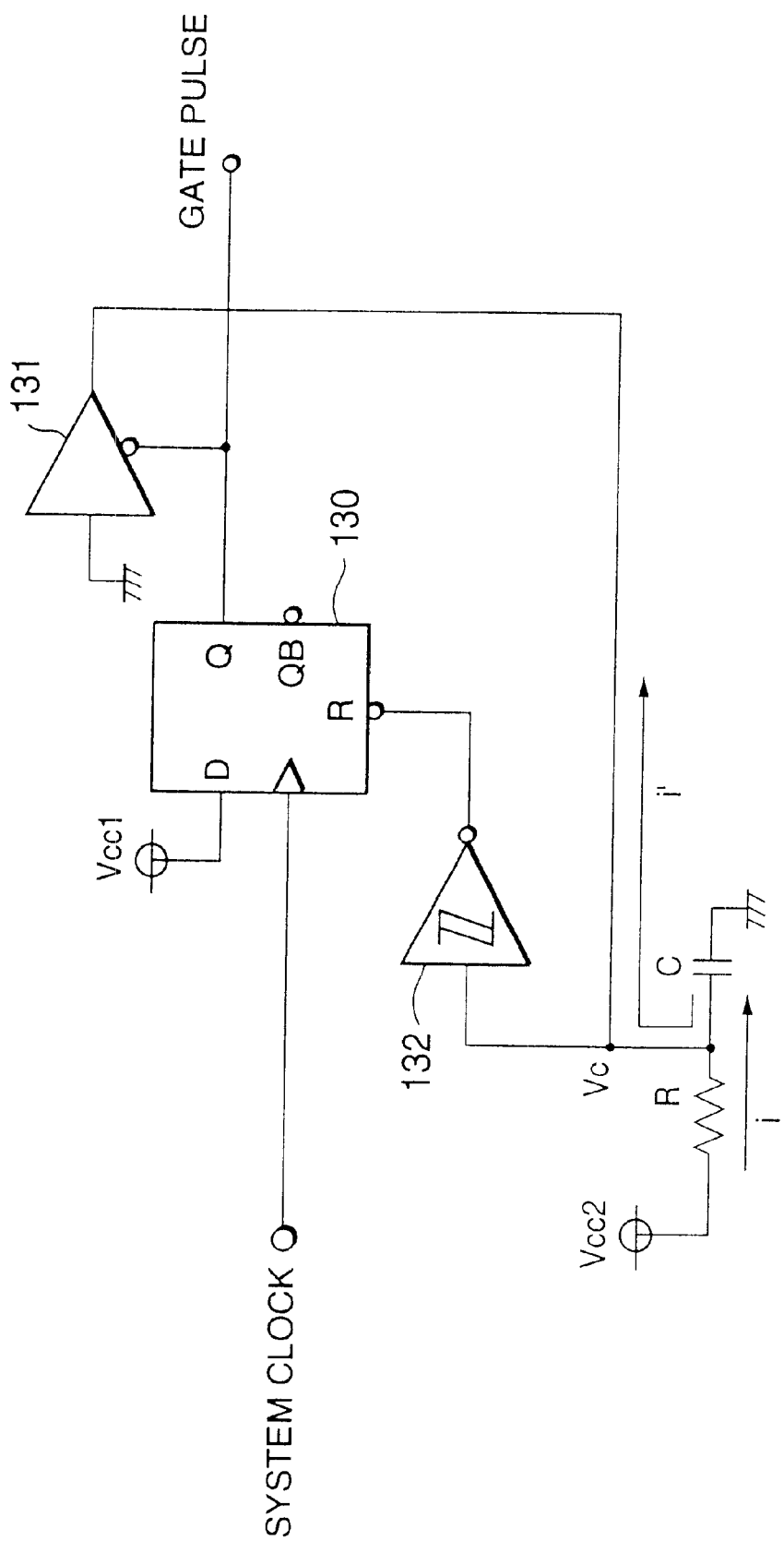

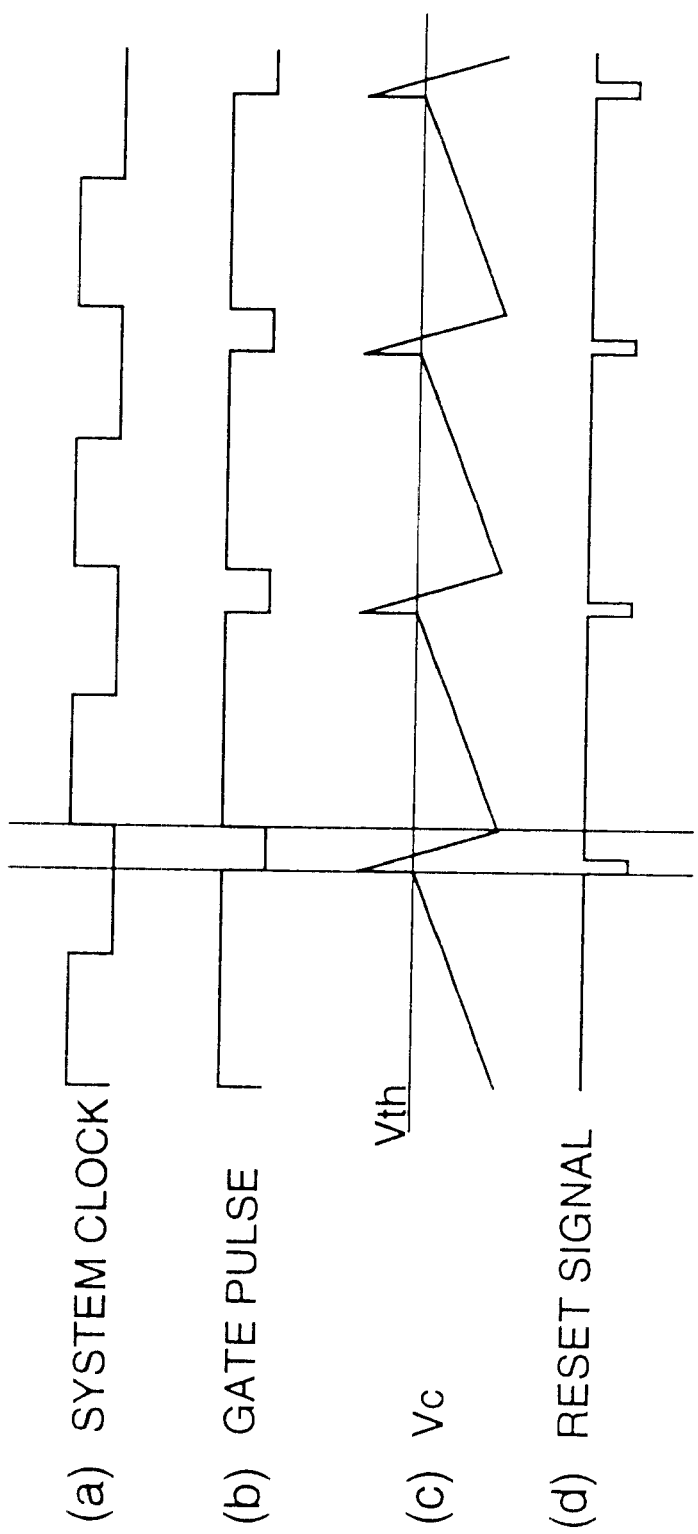

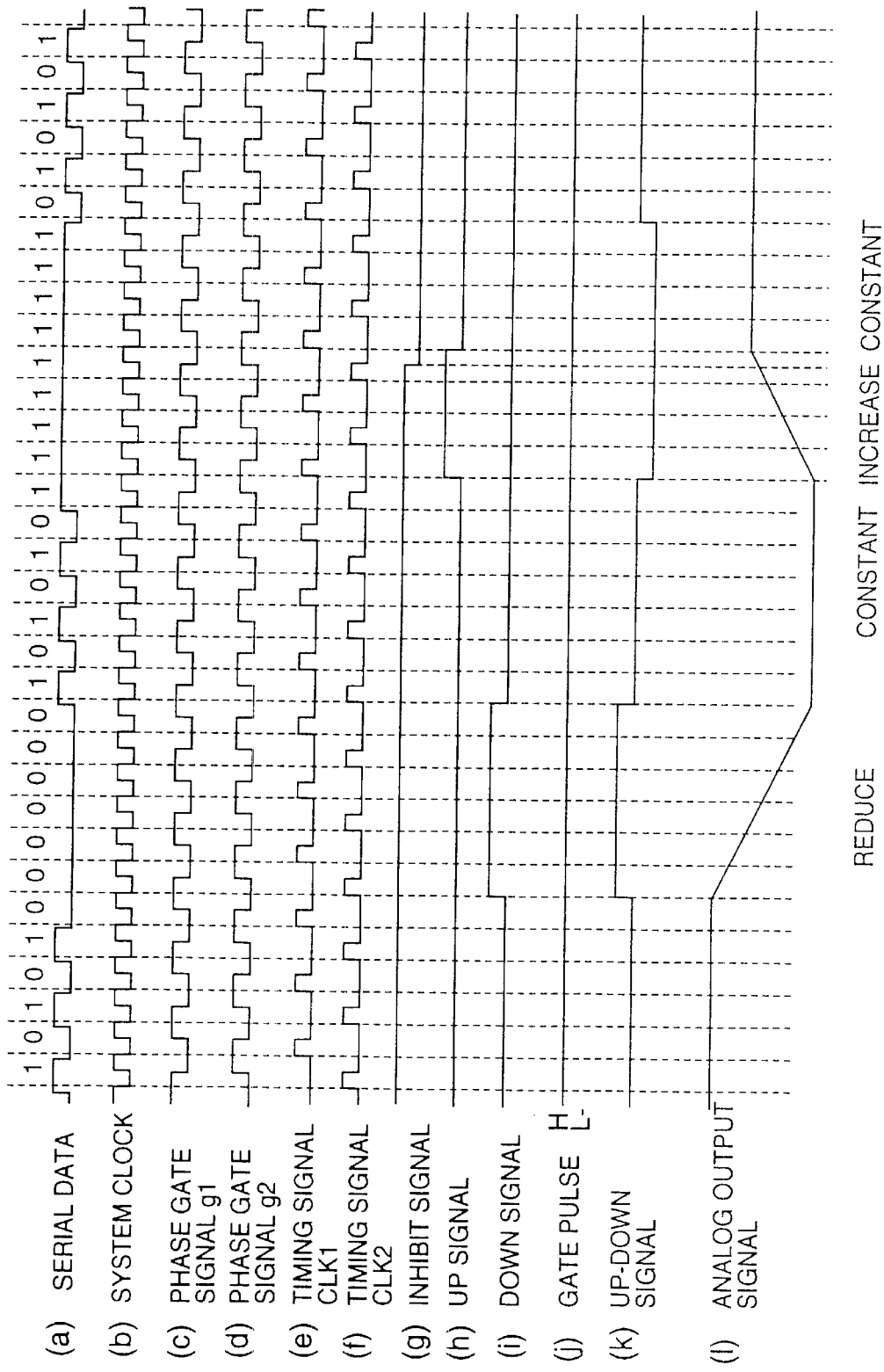

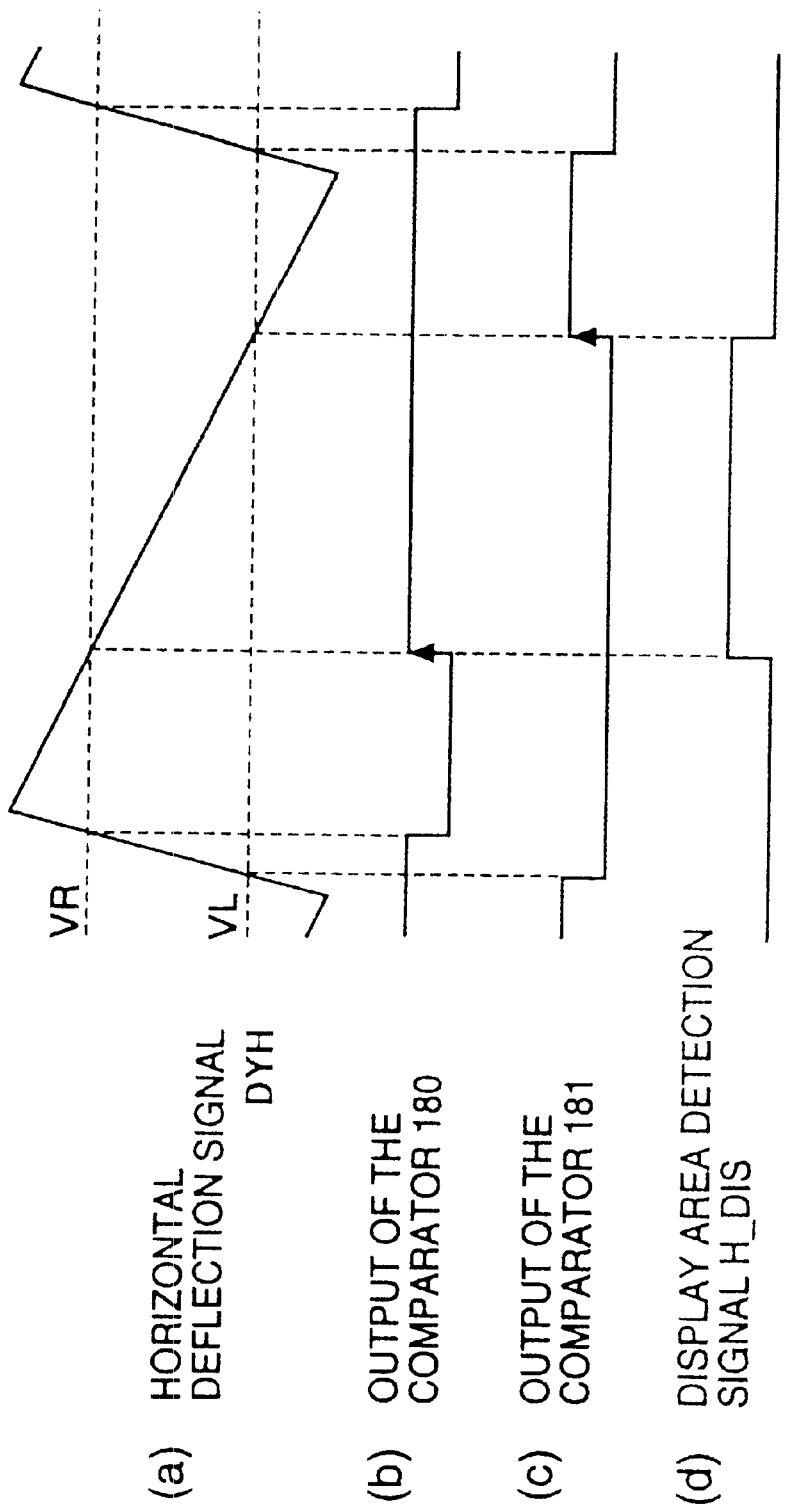

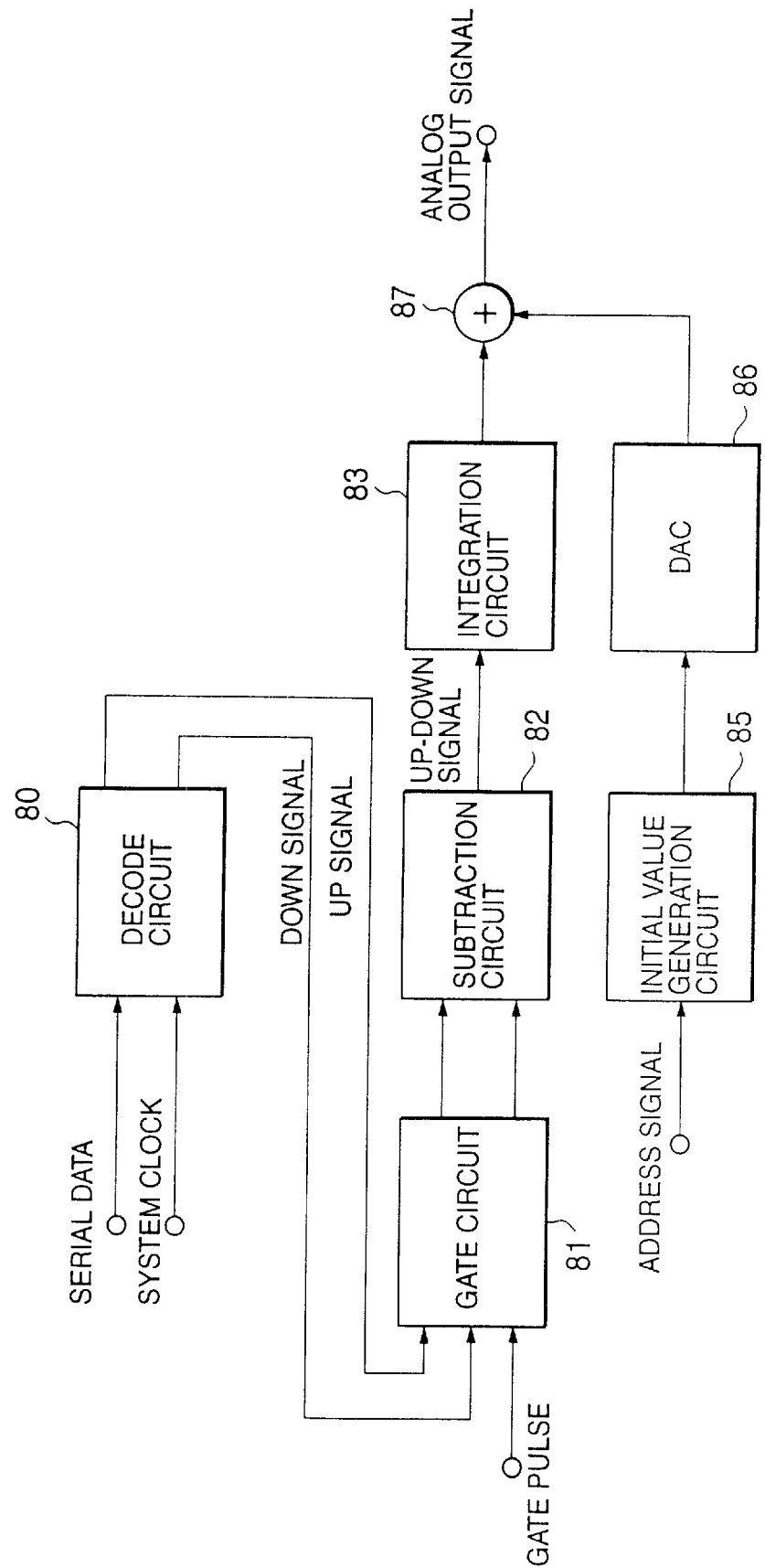

DIGITAL CONVERGENCE CORRECTION DEVICE AND DISPLAY DEVICE

CROSS-REFERENCE TO RELATED APPLICATION

This Application is a continuation of International Application NO. PCT/JP97/03647, whose international filing date is Oct. 9, 1997, the disclosure of which Application is incorporated by reference herein.

BACKGROUND OF THE INVENTION

1. Field of the Invention

The present invention relates to a digital convergence correction device and to a display device comprising the digital convergence correction device.

2. Description of the Related Art

Generally, in digital convergence correction device, a plurality of points on a CRT screen are established to be convergence correction points, and a convergence correction amount in each convergence correction point is preliminarily obtained and stored in a memory as correction data. Then, the correction data are read out from the memory synchronously with screen scanning, and the correction data read out are converted to an analog signal. Then, a convergence correction signal is generated by interpolating (smoothing) the analog signal with a low-pass filter, and a convergence yoke coil (CY coil) of the CRT is driven.

The convergence correction amount is a value determined depending on a position on the CRT screen. That is, the convergence correction amount corresponds to (is associated with) a position on the CRT screen in a relation of 1 to 1. Therefore, the plurality of convergence correction points are predetermined so as to correspond to the position on the CRT screen in a relation of 1 to 1, and with respect to each convergence correction point, the preliminarily obtained convergence correction amount is stored in the memory as correction data.

Accordingly, if a relation between an effective area of picture which is an effective display region on the CRT screen and a screen raster which is a scanning region on the CRT screen varies, there arises a problem that the correction data read out synchronously with the screen scanning fail to correspond to the convergence correction points on the CRT screen.

For example, such a problem arises in the event that the screen raster is enlarged in the direction of over-scan otherwise reduced in the direction of under-scan, or in the event that aspect ratio of the screen raster varies, or in the event that the screen raster is shifted vertically or horizontally within the effective area of picture. Particularly, in the display device capable of inputting an picture signal of different scanning frequency, a relation between the screen raster and the effective area of picture of CRT may vary due to variation in deflecting frequency. In such a case, it is impossible to perform the convergence correction appropriately.

The Japanese Laid-Open Patent Publication (unexamined) No. 33791/1985 discloses a digital convergence correction device capable of performing a convergence correction even if the relation between the screen raster and the effective area of picture of CRT varies. This convergence correction device comprises a memory for storing correction data for each scanning frequency and a low-pass filter for each scanning frequency, and is used by detecting a scanning frequency of picture signal inputted and by selecting a memory and a low-pass filter corresponding to the detected scanning frequency.

However, to perform the convergence correction appropriately, it is necessary to provide a large number of convergence correction points on the CRT screen. To store the correction data for each convergence correction point, a memory of large capacity is required. Accordingly, there is a problem that the convergence correction device provided with such a memory for each scanning frequency is expensive, and the display device is also expensive.

There is a further problem that as a result of providing a low-pass filter corresponding to each scanning frequency, circuitry is complicated and, therefore, the convergence correction device is expensive and the display device is further expensive.

Moreover, in such a conventional convergence correction device, as the relation between the screen raster and the effective area of picture is specified by a scanning frequency, if the relation between the screen raster and the effective area of picture of CRT is different when a picture signal of identical scanning frequency is inputted, there is a further problem that any convergence correction cannot be performed appropriately.

On the other hand, the Japanese Laid-Open Patent Publication (unexamined) No. 20809/1995 discloses a digital convergence correction device of relatively reasonable cost which performs a convergence correction for a picture signal of different scanning frequency. In this convergence correction device, without synchronization with the screen scanning, correction data are read out from a memory with a certain period. Accordingly, even if any picture signal of different scanning frequency is inputted, time interval for reading out the correction data can be constant, and without changing any low-pass filter, it is possible to correspond to the picture signal of different frequency. That is, as this convergence correction device comprises only one low-pass filter, it is possible to provide a convergence correction device of relatively reasonable cost capable of corresponding to different scanning frequency. However, the mentioned problem that a memory of large capacity is required still remains unsolved. Moreover, in the event that the relation between the screen raster and the effective area of picture is different, it is impossible to perform any convergence correction appropriately.

SUMMARY OF THE INVENTION

A digital convergence correction device according to the invention comprises: a memory for storing correction data for each convergence correction point that corresponds to a position on a screen in a relation of 1 to 1, and an address counter for generating a read address with respect to the memory synchronously with screen scanning; and in which a convergence correction signal is generated in accordance with the correction data read out;

the mentioned digital convergence correction device comprising: a vertical display area detection circuit for generating and outputting a vertical display area detection signal that corresponds to a position in vertical direction of a picture display area on the screen in accordance with a vertical deflecting current; and an address control circuit for controlling an address counter in accordance with the vertical display area detection signal.

In the digital convergence correction device of above arrangement, by controlling the address counter in accordance with the vertical display area detection signal detection signal that corresponds to a position in vertical direction of a picture display area on the screen, it is possible to read out the correction data from the memory corresponding to the picture display area on the screen. As a result, even if a relation between a screen raster and an effective area of picture varies with respect to the vertical direction, a convergence correction can be performed with a high precision. That is, even in the event of over scan, it is possible to read out the correction data from the memory synchronously with screen scanning in such a manner as to correspond to each convergence correction point that corresponds to a position on the screen in the relation of 1 to 1.

A display device according to the invention comprises the mentioned digital convergence correction device having an indication signal generation circuit for outputting a display area indication signal in accordance with the vertical display area detection signal, and a picture display circuit for displaying a picture in accordance with the display area indication signal from the digital convergence correction circuit.

As a result, it is possible to display on the screen a display area indication signal with respect to vertical direction, and to obtain easily a vertical display area detection signal when a position in vertical direction of the screen raster is coincident to a position in vertical direction of the effective area of picture.

A digital convergence correction device according to the invention comprises: a memory for storing correction data for each convergence correction point that corresponds to a position on a screen in a relation of 1 to 1, and an address counter for generating a read address with respect to the memory synchronously with screen scanning; and in which a convergence correction signal is generated in accordance with the correction data read out;

the mentioned digital convergence correction device comprising: a horizontal display area detection circuit for generating and outputting a horizontal display area detection signal that corresponds to a position in horizontal direction of a picture display area on the screen in accordance with a horizontal deflecting current; and an address control circuit for controlling an address counter in accordance with the horizontal display area detection signal.

In the digital convergence correction device of above arrangement, by controlling the address counter in accordance with the horizontal display area detection signal detection signal that corresponds to a position in horizontal direction of a picture display area on the screen, it is possible to read out the correction data from the memory corresponding to the picture display area on the screen. As a result, even if a relation between the screen raster and the effective area of picture varies with respect to the horizontal direction, a convergence correction can be performed with a high precision. That is, even in the event of over scan, it is possible to read out the correction data from the memory synchronously with screen scanning in such a manner as to correspond to each convergence correction point that corresponds to a position on the screen in the relation of 1 to 1.

The display device according to the invention comprises the mentioned digital convergence correction device.

As a result, even if the relation between the screen raster and the effective area of picture varies with respect to the horizontal direction, there is no lowering in precision of the convergence correction, and a picture display of high quality can be performed.

A digital convergence correction device according to the invention comprises: a memory for storing correction data for each convergence correction point that corresponds to a position on a screen in a relation of 1 to 1, and an address counter for generating a read address with respect to the memory synchronously with screen scanning; and in which a convergence correction signal is generated in accordance with the correction data read out;

the mentioned digital convergence correction device being characterized by comprising: a vertical display area detection circuit for generating and outputting a vertical display area detection signal that corresponds to a position in vertical direction of a picture display area on the screen in accordance with a vertical deflecting current; a horizontal display area detection circuit for generating and outputting a horizontal display area detection signal that corresponds to a position in horizontal direction of a picture display area on the screen in accordance with a horizontal deflecting current; and an address control circuit for controlling an address counter in accordance with the vertical display area detection signal.

In the digital convergence correction device of above arrangement, by generating the vertical display area detection signal and the horizontal display area detection signal and by controlling the address counter in accordance with these signals, it is possible to read out the correction data from the memory corresponding to the picture display area on the screen. As a result, even if a relation between the screen raster and the effective area of picture varies with respect to any of the vertical and horizontal directions, a convergence correction can be performed with a high precision. That is, even in the event of over scan, it is possible to read out the correction data from the memory synchronously with screen scanning in such a manner as to correspond to each convergence correction point that corresponds to a position on the screen in the relation of 1 to 1.

The display device according to the invention comprises the mentioned digital convergence correction device.

As a result, even if the relation between the screen raster and the effective area of picture varies with respect to any of the horizontal direction and the horizontal direction, there is no lowering in precision of the convergence correction, and a picture display of high quality can be performed.

BRIEF DESCRIPTION OF THE DRAWINGS

FIG. 1 is a block diagram showing schematically an arrangement of a display device according to example 1.

FIG. 2 is a block diagram showing an example of arrangement of a convergence correction circuit B1 shown in FIG. 1.

FIG. 3(a) is a diagram showing a specific arrangement of a 1 bit latch 7.

FIG. 5 is a timing chart showing variation in principal signals in the 1 bit DAC (8) shown in FIG. 4 when the gate pulse is on a high level at all times.

FIGS. 6(A) and (B) are timing charts each showing variation in principal signals of the 1 bit DAC (8) shown in FIG. 2 in the event of different two horizontal deflecting frequencies. FIG. 6 (B) shows that a blanking pulse H_BLK of which frequency is ½ of that in FIG. 6(A) is inputted.

FIG. 7 is a diagram showing an example of an essential part of the digital convergence correction device according to example 2, and is a circuit diagram showing an arrangement of a gate pulse generation circuit 13 shown in FIG. 1.

FIG. 8 is a timing chart showing variation in principal signals in a gate pulse generation circuit shown in FIG. 7.

FIG. 11 is a timing chart showing variation in principal signals in the 1 bit DAC shown in FIG. 10 in the event of variation in scanning frequency.

FIG. 12(a) shows an over scan in which a screen raster is larger than an effective area of picture of a CRT.

FIG. 20 is a diagram showing an example of a variation in each signal of the horizontal display area detection circuit 18 shown in FIG. 19.

FIG. 21(a) shows an over scan, FIG. 21(b) shows an under scan, and FIG. 21(c) shows that a screen raster is coincident to an effective area of picture.

FIG. 22(a) shows a time lag in timing in vertical direction.

FIG. 23(a) shows a memory address mapping in the state of over scan.

FIG. 24 is a block diagram showing an example of an arrangement of a 1 bit DAC (8B) shown in FIG. 16.

DETAILED DESCRIPTION OF THE PREFERRED EMBODIMENT

Figure 3A:
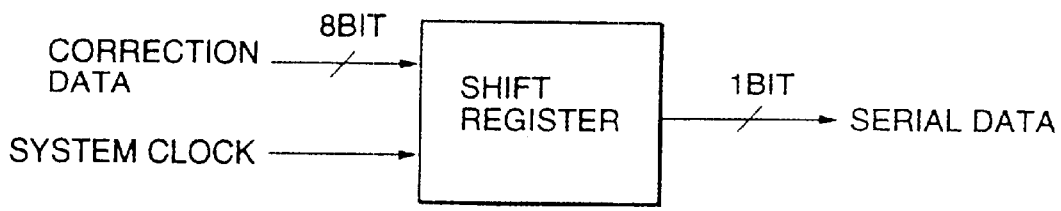
FIGS. 3(a), (b) and (c) are explanatory diagrams to explain the operation of a memory 6 and 1 bit latch 7.

A digital convergence correction device according to the invention comprises: a memory for storing correction data for each convergence correction point that corresponds to a position on a screen in a relation of 1 to 1, and an address counter for generating a read address with respect to the memory synchronously with screen scanning; and in which a convergence correction signal is generated in accordance with the correction data read out;

the mentioned digital convergence correction device comprising: a vertical display area detection circuit for generating and outputting a vertical display area detection signal that corresponds to a position in vertical direction of a picture display area on the screen in accordance with a vertical deflecting current; and an address control circuit for controlling an address counter in accordance with the vertical display area detection signal.

In the digital convergence correction device of above arrangement, by controlling the address counter in accordance with the vertical display area detection signal detection signal that corresponds to a position in vertical direction of a picture display area on the screen, it is possible to read out the correction data from the memory corresponding to the picture display area on the screen. As a result, even if a relation between a screen raster and an effective area of picture varies with respect to the vertical direction, a convergence correction can be performed with a high precision. That is, even in the event of over scan, it is possible to read out the correction data from the memory synchronously with screen scanning in such a manner as to correspond to each convergence correction point that corresponds to a position on the screen in the relation of 1 to 1.

In the digital convergence correction device according to an embodiment of the invention, the vertical display area detection circuit comprises a comparator for comparing a current value of the vertical deflecting current with a predetermined comparison level, and in the event of under scan, a level that corresponds to positions of two ends in vertical direction of a screen raster is used as a comparison level, and in the event of over scan, a level that corresponds to positions of two ends in vertical direction of an effective area of picture is used as a comparison level.

As a result, even if a relation between the screen raster and the effective area of picture varies with respect to the vertical direction, it is possible to generate a vertical display area detection signal that corresponds to a position in vertical direction of the picture display area, thus a desired convergence correction can be performed.

In the digital convergence correction device according to another embodiment of the invention, the address circuit stores preliminarily the vertical display area detection signal in the event of over scan as a signal of vertical effective area of picture, and in the event of under scan, a time lag between a timing of variation in the signal of vertical effective area of picture and a timing of variation in the vertical display area detection signal is obtained, and the time lag is converted to a read address and outputted to the address counter.

As a result, even if a relation between the screen raster and the effective area of picture varies with respect to the vertical direction, a desired convergence correction can be performed. That is, even in the event of under scan, it is possible to read out the correction data from the memory synchronously with screen scanning in such a manner as to correspond to each convergence correction point that corresponds to a position on the screen in the relation of 1 to 1.

The digital convergence correction circuit according to another embodiment of the invention comprises an indication signal generation circuit for outputting a display area indication signal that indicates a picture display area in vertical direction on the screen in accordance with the vertical display area detection signal.

As a result, it is possible to display a display area indication signal with respect to vertical direction, and to obtain easily a vertical display area detection signal when a position in vertical direction of the screen raster is coincident to a position in vertical direction of the effective area of picture.

A display device according to the invention comprises the mentioned digital convergence correction device having an indication signal generation circuit for outputting a display area indication signal in accordance with the vertical display area detection signal, and a picture display circuit for displaying a picture in accordance with the display area indication signal from the digital convergence correction circuit.

As a result, it is possible to display on the screen a display area indication signal with respect to vertical direction, and to obtain easily a vertical display area detection signal when a position in vertical direction of the screen raster is coincident to a position in vertical direction of the effective area of picture.

In the digital convergence correction device according to another embodiment of the invention, in the event of over scan, the address control circuit outputs a read address during a first horizontal scanning period to the address counter for each horizontal scanning period, from a time of variation in a vertical synchronizing signal up to a time of variation in the vertical display area detection signal, in accordance with the vertical synchronizing signal and the vertical display area detection signal.

As a result, in the event of over scan, the convergence correction signal varies suddenly on and around the upper end of the picture display area on the screen, whereby the display picture can be prevented from disorder.

In the digital convergence correction device according to another embodiment of the invention, in the event of over scan, the address control circuit outputs a read address during a final horizontal scanning period to the address counter for each horizontal scanning period, from a time of variation in the vertical synchronizing signal up to a time of variation in the vertical display area detection signal, in accordance with the vertical synchronizing signal and the vertical display area detection signal.

As a result, in the event of over scan, the convergence correction signal varies suddenly on and around the lower end of the picture display area on the screen, whereby the display picture can be prevented from disorder.

The display device according to an embodiment of the invention comprises the mentioned digital convergence correction device.

As a result, even if the relation between the screen raster and the effective area of picture varies with respect to the vertical direction, there is no lowering in precision of the convergence correction, and a picture display of high quality can be performed.

A digital convergence correction device according to another embodiment of the invention comprises: a memory for storing correction data for each convergence correction point that corresponds to a position on a screen in a relation of 1 to 1, and an address counter for generating a read address with respect to the memory synchronously with screen scanning; and in which a convergence correction signal is generated in accordance with the correction data read out;

the mentioned digital convergence correction device comprising: a horizontal display area detection circuit for generating and outputting a horizontal display area detection signal that corresponds to a position in horizontal direction of a picture display area on the screen in accordance with a horizontal deflecting current; and an address control circuit for controlling an address counter in accordance with the horizontal display area detection signal.

In the digital convergence correction device of above arrangement, by controlling the address counter in accordance with the horizontal display area detection signal detection signal that corresponds to a position in horizontal direction of a picture display area on the screen, it is possible to read out the correction data from the memory corresponding to the picture display area on the screen. As a result, even if a relation between the screen raster and the effective area of picture varies with respect to the horizontal direction, a convergence correction can be performed with a high precision. That is, even in the event of over scan, it is possible to read out the correction data from the memory synchronously with screen scanning in such a manner as to correspond to each convergence correction point that corresponds to a position on the screen in the relation of 1 to 1.

In the digital convergence correction device according to another embodiment of the invention, the horizontal display area detection circuit comprises a comparator for comparing a current value of the horizontal deflecting current with a predetermined comparison level, and in the event of under scan, a level that corresponds to positions of two ends in horizontal direction of the screen raster is used as a comparison level; and in the event of over scan, a level that corresponds to positions of two ends in horizontal direction of the effective area of picture is used as a comparison level.

As a result, even if a relation between the screen raster and the effective area of picture varies with respect to the horizontal direction, it is possible to generate a horizontal display area detection signal that corresponds to a position in horizontal direction of the picture display area, thus a desired convergence correction can be performed.

In the digital convergence correction device according to another embodiment of the invention, the address circuit stores preliminarily the horizontal display area detection signal in the event of over scan as a signal of horizontal effective area of picture, and in the event of under scan, a time lag between a timing of variation in the signal of horizontal effective area of picture and a timing of variation in the horizontal display area detection signal is obtained, and the time lag is converted to a read address and outputted to the address counter.

As a result, even if a relation between the screen raster and the effective area of picture varies with respect to the horizontal direction, a desired convergence correction can be performed. That is, even in the event of under scan, it is possible to read out the correction data from the memory synchronously with screen scanning in such a manner as to correspond to each convergence correction point that corresponds to a position on the screen in the relation of 1 to 1.

The display device according to another embodiment of the invention comprises the mentioned digital convergence correction device.

As a result, even if the relation between the screen raster and the effective area of picture varies with respect to the horizontal direction, there is no lowering in precision of the convergence correction, and a picture display of high quality can be performed.

The digital convergence correction circuit according to another embodiment of the invention comprises an indication signal generation circuit for outputting a display area indication signal that indicates a picture display area in horizontal direction on the screen in accordance with the horizontal display area detection signal.

As a result, it is possible to display a display area indication signal with respect to horizontal direction, and to obtain easily a horizontal display area detection signal when a position in horizontal direction of the screen raster is coincident to a position in horizontal direction of the effective area of picture.

A display device according to another embodiment of the invention comprises the mentioned digital convergence correction device having an indication signal generation circuit for outputting a display area indication signal in accordance with the horizontal display area detection signal, and a picture display circuit for displaying a picture in accordance with the display area indication signal from the digital convergence correction circuit.

As a result, it is possible to display on the screen a display area indication signal with respect to horizontal direction, and to obtain easily a horizontal display area detection signal when a position in horizontal direction of the screen raster is coincident to a position in horizontal direction of the effective area of picture.

A digital convergence correction device according to another embodiment of the invention comprises: a memory for storing correction data for each convergence correction point that corresponds to a position on a screen in a relation of 1 to 1, and an address counter for generating a read address with respect to the memory synchronously with screen scanning; and in which a convergence correction signal is generated in accordance with the correction data read out;

the mentioned digital convergence correction device being characterized by comprising: a vertical display area detection circuit for generating and outputting a vertical display area detection signal that corresponds to a position in vertical direction of a picture display area on the screen in accordance with a vertical deflecting current; a horizontal display area detection circuit for generating and outputting a horizontal display area detection signal that corresponds to a position in horizontal direction of a picture display area on the screen in accordance with a horizontal deflecting current; and an address control circuit for controlling an address counter in accordance with the vertical display area detection signal.

In the digital convergence correction device of above arrangement, by generating the vertical display area detection signal and the horizontal display area detection signal and by controlling the address counter in accordance with these signals, it is possible to read out the correction data from the memory corresponding to the picture display area on the screen. As a result, even if a relation between the screen raster and the effective area of picture varies with respect to any of the vertical and horizontal directions, a convergence correction can be performed with a high precision. That is, even in the event of over scan, it is possible to read out the correction data from the memory synchronously with screen scanning in such a manner as to correspond to each convergence correction point that corresponds to a position on the screen in the relation of 1 to 1.

In the digital convergence correction device according to another embodiment of the invention, the vertical display area detection circuit comprises a comparator for comparing a current value of the vertical deflecting current with a predetermined comparison level, and in the event of under scan, a level that corresponds to positions of two ends in vertical direction of the screen raster is used as a comparison level, and in the event of over scan, a level that corresponds to positions of two ends in vertical direction of the effective area of picture is used as a comparison level; and the horizontal display area detection circuit comprises a comparator for comparing a current value of the horizontal deflecting current with a predetermined comparison level, and in the event of under scan, a level that corresponds to positions of two ends in horizontal direction of the screen raster is used as a comparison level, and in the event of over scan, a level that corresponds to positions of two ends in horizontal direction of the effective area of picture is used as a comparison level.

As a result, even if a relation between the screen raster and the effective area of picture, it is possible to generate a vertical display area detection signal that corresponds to a position in vertical direction of the picture display area and to generate a horizontal display area detection signal that corresponds to a position in horizontal direction of the picture display area, thus a desired convergence correction can be performed.

In the digital convergence correction device according to another embodiment of the invention, the address circuit stores preliminarily the vertical display area detection signal in the event of over scan as a signal of vertical effective area of picture and the address circuit stores preliminarily the horizontal display area detection signal in the event of over scan as a signal of horizontal effective area of picture, and in the event of under scan, a time lag between a timing of variation in the signal of vertical effective area of picture and a timing of variation in the vertical display area detection signal is obtained and a time lag between a timing of variation in the signal of horizontal effective area of picture and a timing of variation in the horizontal display area detection signal is obtained, and the time lags are converted to a read address and outputted to the address counter.

As a result, even if a relation between the screen raster and the effective area of picture varies with respect to any of the vertical and horizontal directions, a desired convergence correction can be performed. That is, even in the event of under scan, it is possible to read out the correction data from the memory synchronously with screen scanning in such a manner as to correspond to each convergence correction point that corresponds to a position on the screen in the relation of 1 to 1.

The display device according to another embodiment of the invention comprises the mentioned digital convergence correction device.

As a result, even if the relation between the screen raster and the effective area of picture varies with respect to any of the horizontal direction and the horizontal direction, there is no lowering in precision of the convergence correction, and a picture display of high quality can be performed.

The digital convergence correction circuit according to another embodiment of the invention comprises an indication signal generation circuit for outputting a display area indication signal that indicates a picture display area in vertical direction on the screen in accordance with the vertical display area detection signal and the horizontal display area detection signal.

As a result, it is possible to display a display area indication signal with respect to both vertical and horizontal direction, and to obtain easily a vertical display area detection signal and a horizontal display area detection signal coincident to the effective area of picture.

A display device according to another embodiment of the invention comprises the mentioned digital convergence correction device having an indication signal generation circuit for outputting a display area indication signal in accordance with the vertical display area detection signal and the horizontal display area detection signal, and a picture display circuit for displaying a picture in accordance with the display area indication signal from the digital convergence correction circuit.

As a result, it is possible to display on the screen a display area indication signal with respect to both vertical and horizontal directions, and to obtain easily a vertical display area detection signal and a horizontal display area detection signal coincident to the effective area of picture.

EXAMPLE 1

FIG. 1 is a block diagram showing schematically an arrangement of a display device according to example 1. In the drawing, reference numeral A1 indicates a picture display circuit, numeral B1 indicates a convergence correction circuit, numeral C indicates a CRT, numeral C1 indicates a deflecting yoke, and numeral C2 indicates a convergence yoke. The picture display circuit A1 is a circuit for displaying a picture on the CRT screen in accordance with an input picture signal. The picture display circuit A1 supplies a vertical deflecting current iDYV and a horizontal deflecting current iDYH to the deflecting yoke C1, and supplies a color signal to a cathode of the CRT. The convergence correction circuit B1 supplies a convergence correction current iCY to the convergence yoke C2 in accordance with a horizontal blanking pulse H_BLK and a vertical blanking pulse V_BLK from the picture display circuit A1, and corrects a deflection angle of an electron beam.

FIG. 2 is a block diagram showing an example of the convergence correction circuit B1 shown in FIG. 1. In the drawing, reference numeral 1 indicates an input terminal of the horizontal blanking pulse H_BLK, numeral 2 indicates an input terminal of the vertical blanking pulse V_BLK, and numeral 3 indicates a phase locked loop circuit (PLL). Numeral 4 indicates a dividing counter, numeral 5 indicates an address counter, and numeral 6 indicates a memory. Numeral 7 indicates a 1 bit latch, numeral 8 indicates a 1 bit DAC, and numeral 9 indicates a low-pass filter. Numeral 10 indicates an amplifier, numeral 11 indicates an output terminal of a convergence correction current iCY, and numeral 13 indicates a gate pulse generation circuit.

[1] First, elements shown in FIG. 2 are hereinafter described. The horizontal blanking pulse H_BLK of a frequency fH synchronizing with raster scan on the CRT is inputted to the H_BLK input terminal 1, and the PLL 3 generates a reference clock by multiplying the horizontal blanking pulse H_BLK. Further, the dividing counter 4 divides the reference clock and generates a system clock. As a result, the system clock controls the dividing in horizontal direction to be constant at all times.

The address counter 5 synchronizes with the system clock, and generates the read addresses of the memory 6 in order. These addresses correspond to time phases in horizontal direction and vertical direction of the raster scan, i.e., to relative positions in the screen raster, respectively. The vertical blanking pulse V_BLK of a frequency fv synchronizing with raster scan on the CRT is inputted to the V_BLK input terminal 2, and the horizontal blanking pulse V_BLK resets the address counter 5.

The memory 6 preliminarily stores a correction amount in each convergence correction point corresponding to a position on the CRT screen in a relation of 1 to 1 as correction data. These correction data are up/down information (variation information) at the time when the correction amount in the corresponding convergence correction point is compared with a correction amount of an adjacent convergence correction point in horizontal direction. Each of the correction data comprises 1 bit, and "1" indicates "increase" in correction amount and "0" indicates "reduction" in correction amount. In this manner, memory capacity for storing the correction data is largely reduced as compared with the conventional convergence correction device in which correction amount is stored and held for each convergence correction point.

The correction data of 1 bit can be used together with an adjacent correction data as a linkage pattern of 2 bits. More specifically, an up/down information at a convergence correction point can represent three states of "increase", "reduction", "constant" in the form of up/down information of two bits, by combining correction data of 1 bit which corresponds to the convergence correction point and correction data of 1 bit which corresponds to the adjacent convergence correction point. As the linkage pattern of 2 bits, there are four types of combinations of "00", "01", "10", and "11". Among them, "01" or "10" represents that the correction amount is "constant", "00" represents "reduction" in the correction amount, and "11" represents "increases" in the correction amount. Generally, there is no sudden variation in the convergence correction amount such as variation from "increase" to "reduction" or from "reduction" to "increases". Accordingly, by preliminarily fixing a sufficient number of convergence correction points on the CRT screen, any desired convergence correction can be performed using the correction data as the mentioned linkage pattern.

The correction data are read out from the memory 6 in accordance with the address from the address counter 5. That is, as the readout from the memory 6 is performed synchronously with the raster scan on the CRT, the correction data read out corresponds to the convergence correction point, as far as the relation between the effective area of picture and the screen raster remains unchanged.

As each of the correction data is of 1 bit, when bit width of the memory 6 is 8 bits, the correction data for eight convergence correction points can be stored in one address, and the 8 correction data can be read out simultaneously. The 1 bit latch 7 is a circuit for converting the data read out from the memory 6 to serial data and comprises a shift transistor. For example, when the data of 8 bits are read out from the memory 6, the data are divided into correction data of 1 bit for each convergence correction point, and outputted from MSB side in order as the serial data synchronously with the system clock.

Figure 3B:
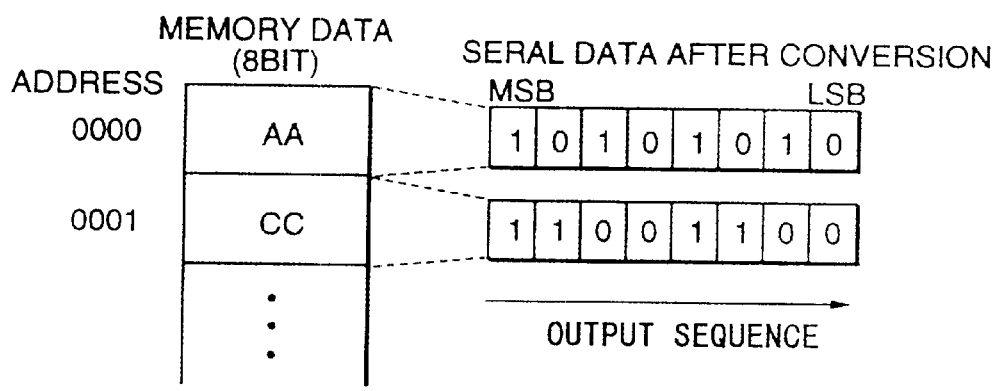
FIG. 3(b) is a diagram showing that data are read out from the memory 6 in order and converted to serial data.
Figure 3C:
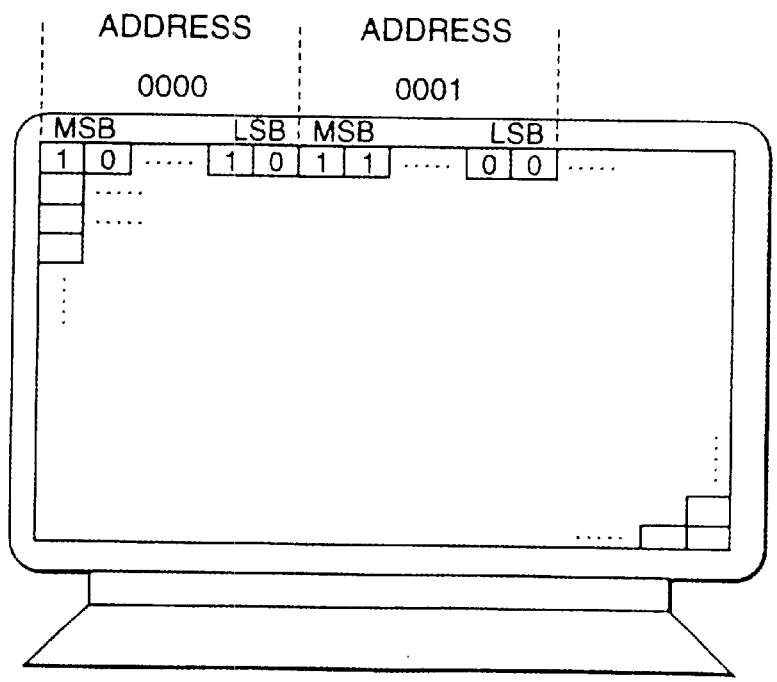
FIG. 3(c) is a view showing that each of the serial data corresponds to a position on the CRT screen in a relation of 1 to 1.

FIGS. 3(*a*), (*b*) and (*c*) are explanatory diagrams to explain the operation of a memory 6 and 1 bit latch 7. FIG. 3(*a*) is a diagram showing a specific arrangement of a 1 bit latch 7. FIG. 3(*b*) is a diagram showing that data are read out from the memory 6 in order and converted to serial data. FIG. 3(*c*) is a view showing that each of the serial data corresponds to a position on the CRT screen in a relation of 1 to 1. As shown in FIGS. 3(*b*) and (*c*), the correction data are read out in order for the convergence correction points on the first horizontal scanning line on the screen, and converted to the serial data.

Figure 4:
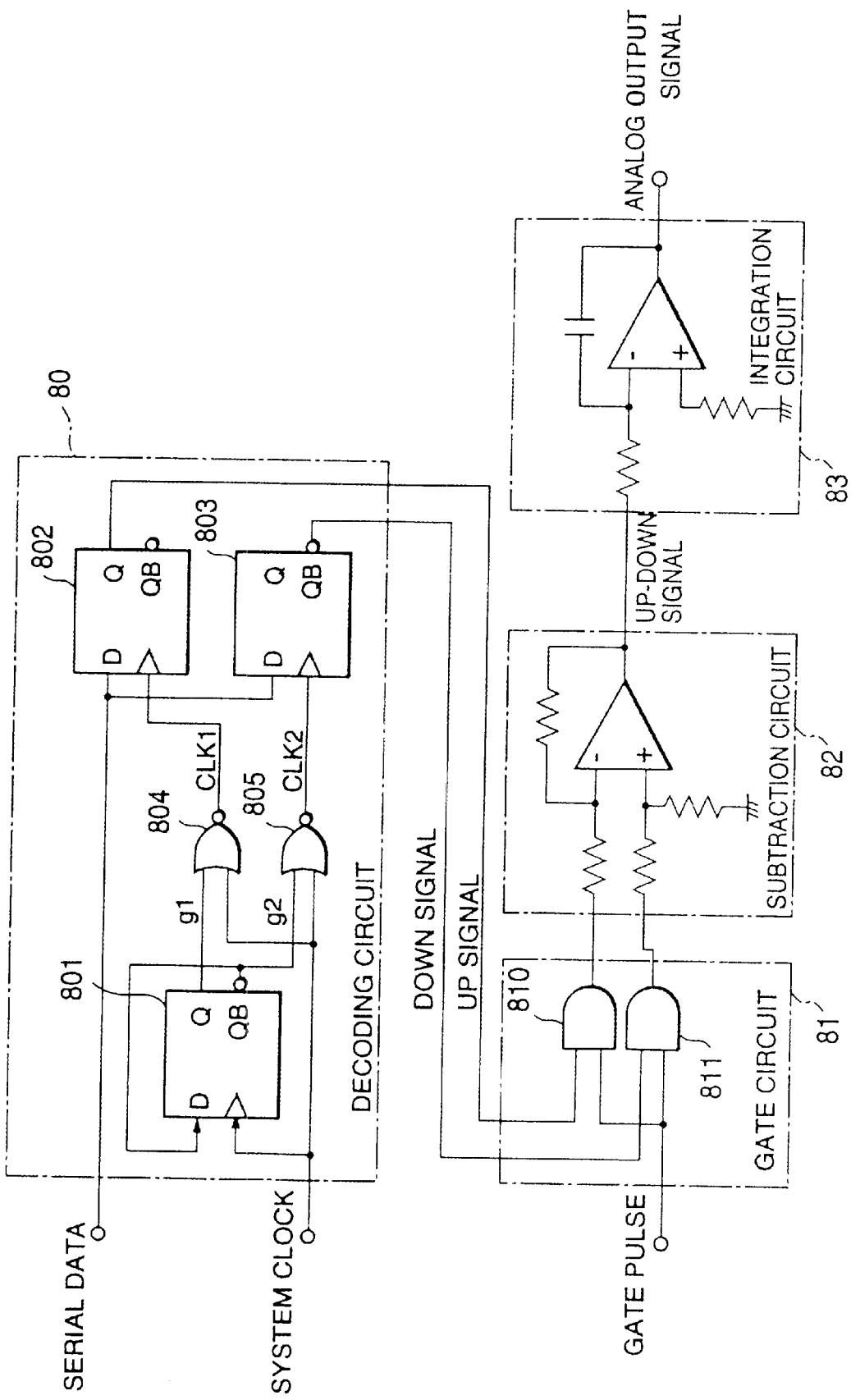
FIG. 4 is a block diagram showing an example of arrangement of a 1 bit DAC (8) shown in FIG. 2.

FIG. 4 is a block diagram showing an example of arrangement of a 1 bit DAC (8) shown in FIG. 2. In the drawing, reference numeral 80 indicates a decoding circuit for converting the serial data to an up signal and a down signal. Numeral 81 indicates a gate circuit for controlling the output time of the up signal and the down signal to be constant irrespective of the scanning frequency. Numeral 82 indicates a subtraction circuit for converting the up signal and the down signal to an up-down signal. Numeral 83 indicates an integration circuit for integrating the up-down signal.

The decoding circuit 80 comprises D flip-flops 801 to 803 and NOR operation circuits 804 and 805. The flip-flop 801 generates phase gate signals g1 and g2 inverting synchronously with the first transition of the system clock. These phase gate signals g1 and g2 are inversion signals with respect to each other. The phase gate signals g1 and g2 become timing signals CLK1 and CLK2 respectively through a NOR operation with a system clock in the NOR operation circuits 804 and 805. The flip-flop 802 synchronizing with the timing signal CLK1 and the flip-flop 803 synchronizing with the timing signal CLK2 store respectively serial data of 1 bit. Then, the flip-flop 802 outputs the stored data as an up signal, while the flip-flop 803 inverts the stored data and outputs it as a down signal.

The gate circuit 81 comprises AND operation circuits 810 and 811. The up signal and the down signal are subject to an AND operation with a later described gate pulse respectively in the AND operation circuits 810 and 811, and inputted to the subtraction circuit 82. That is, only when the gate pulse is on high level, the up signal and the down signal can pass through the gate circuit 81.

The subtraction circuit 82 comprises an operational amplifier and resistors, and generates an up-down signal by subtracting the up signal passed through the gate circuit from the down signal passed through the gate circuit 81. Accordingly, this up-down signal is a signal comprising three voltage levels of −1 level representing the "increase", +1 level representing the "reduction", and ±0 level representing the "constant".

The integration circuit 83 is a mirror integration circuit using an operational amplifier, and outputs an analog signal obtained by integrating the up-down signal. This analog signal becomes a continuous convergence correction signal in the low-pass filter 9, and after being amplified in the amplifier 10, is supplied to the convergence yoke coil C2. By using such a 1 bit DAC (8), it is possible to convert a linkage pattern of 2 bits to an up-down information, and to obtain a desired correction amount at each convergence correction point.

[2] Now, operation of the convergence correction circuit B1 when the gate pulse is on a high level at all times is hereinafter described. FIG. 5 is a timing chart showing variation in principal signals in the 1 bit DAC (8) shown in FIG. 4 when the gate pulse is on a high level at all times. In the drawing, reference symbol (a) indicates serial data, (b) indicates a system clock, (c) indicates a phase gate signal g1, and (d) indicates a phase gate signal g2. Symbol (e) indicates a timing signal CLK1, (f) indicates a timing signal CLK2, (g) indicates an up signal, and (h) indicates a down signal. Symbol (i) indicates a gate pulse, (j) indicates an up-down signal, and (k) indicates an analog output signal.

The timing signals CLK1 and CLK2 outputs pulses alternately and synchronously with the system clock. The up signal is renewed synchronously with the timing signal CLK1, and the down signal is renewed synchronously with the timing signal CLK2.

In this case, since the gate pulse is on a high level at all times, both up signal and down signal pass through the gate circuit 81 at all times, and a result of subtraction of these signals becomes an up-down signal as it is. Therefore, during the period when the linkage pattern of the serial data is "01" or "10", output level of the analog output signal is constant without variation. During the period of "00", the output level reduces continuously, and during the period of "11", the output level increases continuously.

[3] Now, operation of the display device when the horizontal deflecting frequency varies is hereinafter described. FIGS.

6(A) and (B) are timing charts each showing variation in principal signals of the 1 bit DAC (8) shown in FIG. 2 in the event of different two horizontal deflecting frequencies. FIG. 6(B) shows that a blanking pulse H_BLK of which frequency is ½ of that in FIG. 6(A) is inputted. Note that in FIGS. 6 (A) and (B), axis of abscissa is common, that is, it is shown on the same time scale.

The system clock is a signal obtained by multiplying the inputted horizontal blanking pulse and dividing it, and frequency thereof varies in proportion to a horizontal deflecting frequency fH. Accordingly, when the horizontal deflecting frequency fH becomes ½ (a half), the horizontal address counter 6 generates an address with the frequency of ½, and readout of the correction data from the memory 12 is also performed with the frequency of ½. As a result, in the event of FIG. 6(B), both system clock and serial data vary with a period twice as much as that in FIG. 6(A).

On the other hand, the gate pulse generation circuit 13 is a monostable multi-vibrator which generates a gate pulse synchronously with the system clock, and pulse duration of the gate pulse is constant at all times irrespective of the system clock. Accordingly, while the gate pulse in FIG. 6(A) is on a high level at all times, duty ratio of the gate pulse in FIG. 6(B) is 50%. Therefore, the period when the up-down signal is on the "reduction" level and the period when it is on the "increase" level are equal in both FIGS. 6(A) and (B), and the integration periods in the integration circuit 83 are also equal. As a result, even if the analog output signal is extended in the direction of time base, a peak value W can be kept constant at all times.

That is, in this convergence correction device, the frequency of the system clock varies by the PLL 3 in proportion to the variation in the horizontal deflecting frequency, and the system clock keeps the dividing in horizontal direction constant at all times. Accordingly, there arises no time lag in the relation of correspondence between the readout timing of the correction data and convergence correction point to which the correction data should correspond. Even in the event of variation in the horizontal deflecting frequency, the pulse duration of the gate pulse can be kept constant, and irrespective of the horizontal deflecting frequency, the output time in the system clock period of the output signal of the gate circuit 81 is kept constant. Thus, level (i.e., peak value) of the analog output signal corresponding to the convergence correction point is prevented from variation. As a result, even if the horizontal deflecting frequency varies, it is possible to perform a desired convergence correction with respect to each convergence correction point that corresponds to a position on the CRT screen in a relation of 1 to 1.

By using the convergence correction device as described above, it is possible to reduce largely the capacity of the memory for storing and holding the correction data. Further, by determining a correction amount in each convergence correction point with respect to one horizontal deflecting frequency, it is possible to perform a desired convergence correction without determining a further correction amount with respect to other different horizontal deflecting frequency.

Though an example in which one horizontal deflecting frequency is twice as much as another horizontal deflecting frequency is described in this example 1, the convergence correction device according to the invention is not limited to such an example. That is, in the convergence correction device according to the invention, an applicable maximum frequency is achieved when the duty ratio of the gate pulse is 100%. Therefore, the convergence correction device can be applied to any horizontal deflecting frequency within the area not departing from the duty ratio of 100%.

Though correction data of 1 bit is used in this example, it is possible to use correction data of 2 bits. For example, by using data of 2 bits, each state of "increase", "reduction", or "constant" may be stored and held for each convergence correction point without using the data as linkage pattern. It is also possible to store and hold an "increase" of which variation is two gradations and a "reduction" of which variation is two gradations using data of 2 bits.

EXAMPLE 2

FIG. 7 is a diagram showing an example of an essential part of the digital convergence correction device according to example 2, and is a circuit diagram showing an arrangement of the gate pulse generation circuit 13 shown in FIG. 1. The gate pulse generation circuit 13 is a combinational circuit of flip-flop. In the drawing, reference numeral 130 indicates a D flip-flop with a reset terminal, numeral 131 indicates a tristate buffer capable of outputting a high impedance, and numeral 132 indicates an inverter Schmitt buffer. R indicates a resistor, and C indicates a capacitor. FIG. 8 is a timing chart showing variation in principal signals in the gate pulse generation circuit. In the drawings, (a) indicates a system clock, (b) indicates a gate pulse, (c) indicates a terminal voltage Vc of the capacitor, and (d) indicates a reset signal of the flip-flop.

In the flip-flop 130, a high level is inputted from a source voltage Vcc1 to an input terminal D, and a system clock is inputted to a trigger input terminal. Accordingly, an output terminal Q comes to a high level synchronously with the first transition of the system clock, the high level is outputted as a gate pulse, and an output terminal of the tristate buffer 131 varies from a low level to a high impedance state.

When the output terminal of the tristate buffer 131 comes to the high impedance state, a current i flows from the power source Vcc2 to the capacitor C through the resistor R, and the capacitor C is charged. Then, when the terminal voltage Vc of the capacitor C comes to a threshold level Vth of the inverter Schmitt buffer 132, the output terminal of the inverter Schmitt buffer 132 varies to a low level, and the flip-flop 130 is reset.

When the flip-flop 130 is reset, the output terminal Q thereof varies to a low level, and the low level is outputted as a gate pulse, and the output terminal of the tristate buffer 131 comes to a low level. As a result, a current i' flows from the capacitor C to the tristate buffer 131, and the capacitor C is discharged, whereby the output of the inverter Schmitt buffer 132 varies to a high level. By repeating the mentioned operation, it is possible to generate the gate pulse comprising pulses of constant pulse duration synchronizing with the system clock. That is, it is possible to output, synchronously with the scanning frequency, pulses of which pulse duration is constant irrespective of the scanning frequency.

Duration of each pulse forming the gate pulse corresponds to the charging time of the capacitor C and, therefore, the gate pulse can be established to have any desired pulse duration by selecting voltage value of the power source Vcc2, resistance value of the resistor R and capacity. In addition, the pulse duration is easily adjusted by employing a variable power source as the power source Vcc2 and controlling an output voltage thereof by means of a microcomputer (not shown).

EXAMPLE 3

When the scanning frequency is constant, the dividing counter 4 can supply a stable system clock. On the contrary, when the scanning frequency varies, the system clock becomes unstable due to reset of the PLL 3, and the address supplied from the address counter 5 to the memory 6 gets out of order. As a result, each convergence correction point corresponding to a position on the screen in a relation of 1 to 1 does not correspond to the read out correction data. Thus, the convergence correction signal iCY supplied to the convergence yoke coil C2 gets out of order, and picture display comes to get out of order. Described in this example is a display device for preventing any disorder in picture display due to the convergence correction signal, in the event of variation in the scanning frequency of the input picture signal.

Figure 9:
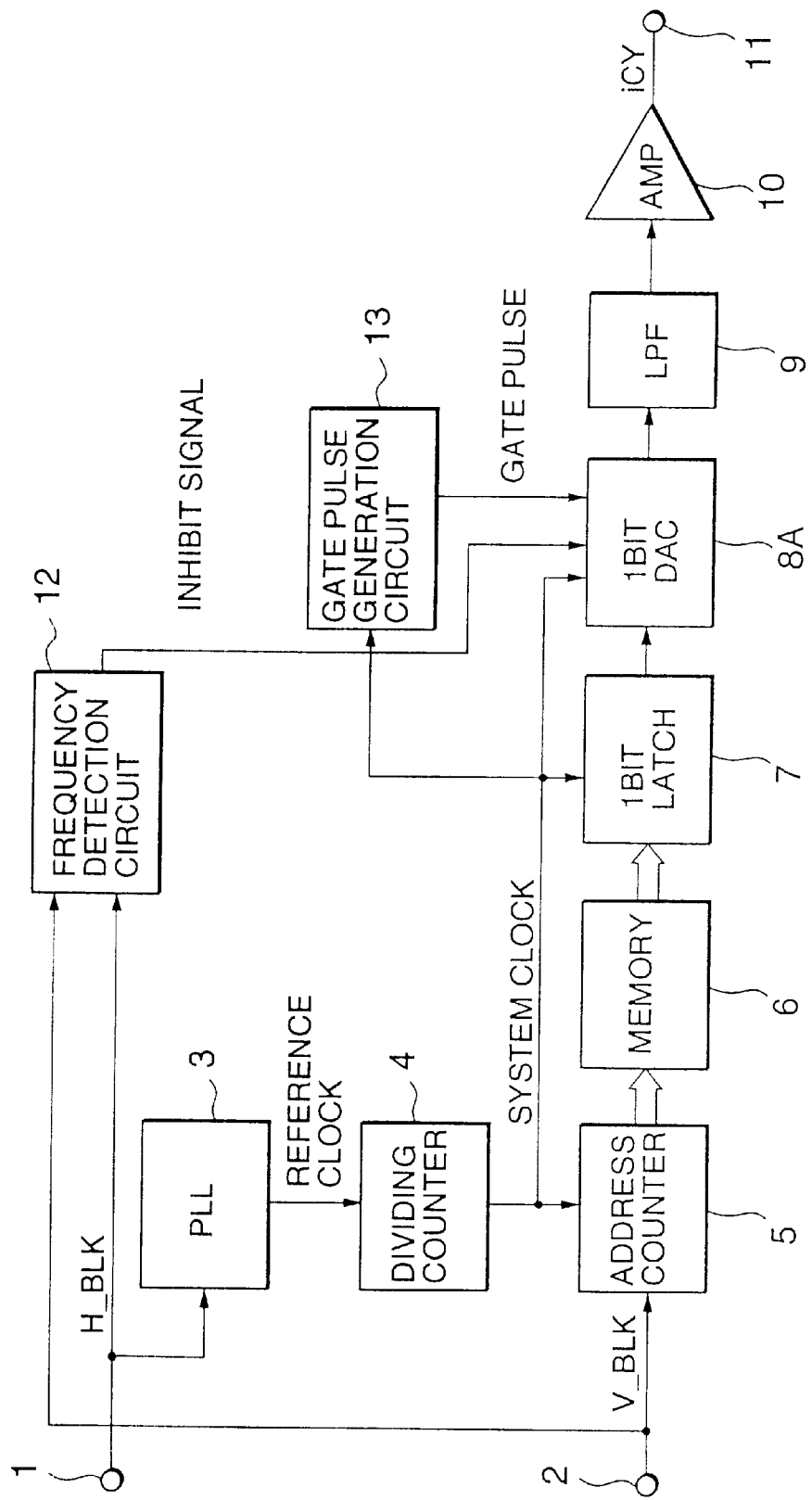
FIG. 9 is a block diagram showing an example of an essential part of the display device according to example 3, and is a block diagram showing another arrangement of the digital convergence correction device shown in FIG. 1.
Figure 10:
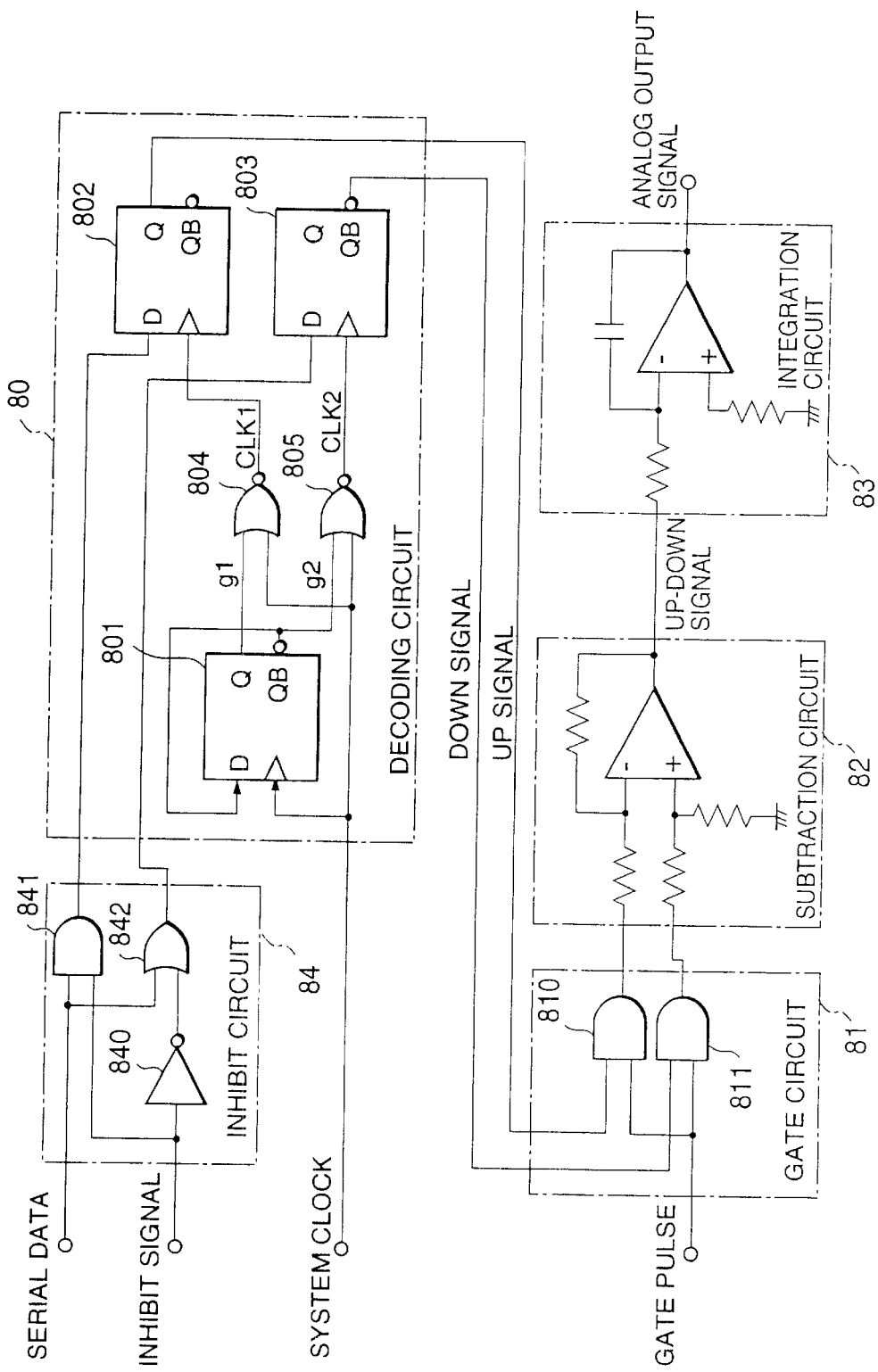
FIG. 10 is a block diagram showing an example of an arrangement of a 1 bit DAC (8A) shown in FIG. 9.

FIG. 9 is a block diagram showing an example of an essential part of the display device according to example 3, and is a block diagram showing an arrangement of the digital convergence correction device shown in FIG. 1. This convergence correction device comprises the convergence correction device shown in FIG. 2 to which a frequency detection circuit 12 is added, and a 1 bit DAC (8A) different from that in FIG. 2. FIG. 10 is a block diagram showing an example of an arrangement of the 1 bit DAC (8A) shown in FIG. 9. This 1 bit DAC (A) comprises the 1 bit DAC shown in FIG. 4 to which an inhibit circuit 84 is added, and in the drawing, reference numeral 840 indicates an inverter (inversion operation circuit), numeral 841 indicates an AND operation circuit, and numeral 842 indicates an OR operation circuit.

The frequency detection circuit 12 is a circuit for monitoring variation in the scanning frequency, resetting the PLL 3 in the event of variation in the frequency, and outputting an inhibit signal to the 1 bit DAC (8A). This circuit can be formed of a microcomputer, for example. In this circuit, a horizontal blanking pulse H_BLK and a vertical blanking pulse V_BLK are inputted, and in the event of variation in horizontal frequency and vertical frequency, the PLL 3 is reset. Further, an inhibit signal of a low level is outputted only for a certain period after the variation in horizontal frequency and vertical frequency.

When the inhibit signal is on a high level, serial data pass through the AND operation circuit 841 and the OR operation circuit 842 as it is, and operates in the quite same manner as the 1 bit DAC in FIG. 4. When the inhibit signal comes to a low level, outputs of the AND operation circuit 841 and the OR operation circuit 842 are respectively fixed to a low level and to a high level, and both up signal and down signal are fixed to a low level. Level of the analog output signal becomes constant.

In the event that the scanning frequency varies, the frequency detection circuit 12 outputs an inhibit signal of a low level until the PLL 3 is reset and the system clock is stabilized. As a result, level of the convergence correction signal can be kept constant, and it becomes possible to prevent the disorder in picture display.

FIG. 11 is a timing chart showing variation in principal signals in the 1 bit DAC shown in FIG. 10 in the event of variation in the scanning frequency. When the inhibit signal varies from the high level to the low level due to the variation in the scanning frequency, both up signal and down signal are fixed to a low level, and the analog output signal is controlled to be constant. Then, after stabilizing the system clock, the frequency detection circuit 12 is controlled to output again an inhibit signal of a high level, and to output a desired analog signal.

Though an example in which the convergence correction signal is controlled in accordance with the variation in horizontal frequency and in vertical frequency is described in this example 3, it is also possible to make a control only in accordance with the variation in horizontal or vertical frequency.

EXAMPLE 4

Described in this example is a display device capable of causing each convergence correction point to correspond to correction data read out from the memory 6, even in the event of variation in the relation between the effective area of picture that is an effective display area on the CRT screen and the screen raster that is a scanning area on the CRT screen.

Figure 12A:
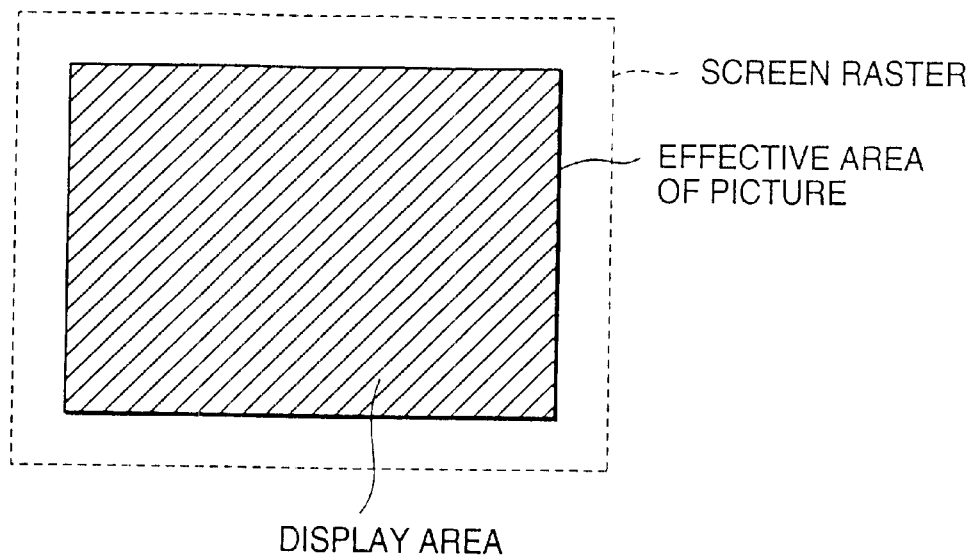
FIGS. 12(a) and (b) are views showing each an example of a display area.
Figure 12B:
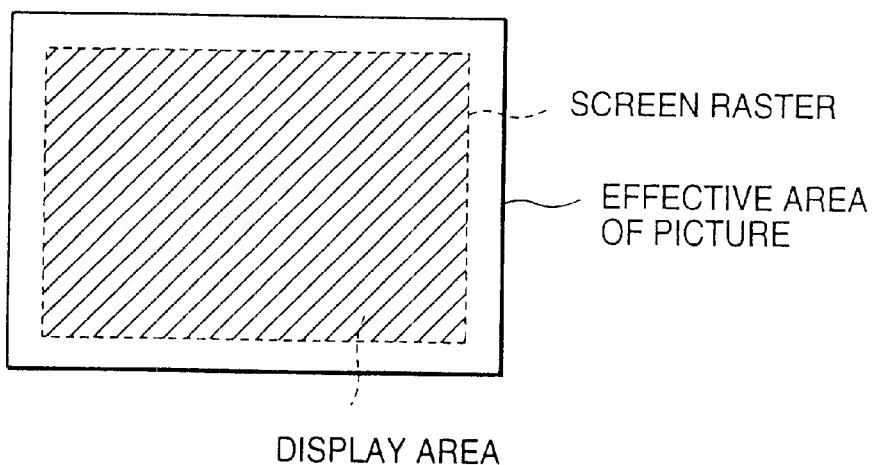
FIG. 12(b) shows an under scan in which the screen raster is smaller than the effective area of picture of a CRT.

First, picture display area that is an area on the screen to display a picture is hereinafter described case by case depending on the relation between the screen raster and the effective area of picture. In this respect, it is to be noted that in this example, the correction area that is an area on the screen for performing the convergence correction is coincident to the picture display area. FIGS. 12(*a*) and (*b*) are views each showing an example of display area. FIG. 12(*a*) shows an over scan in which a screen raster is larger than an effective area of picture of a CRT, and FIG. 12(*b*) shows an under scan in which the screen raster is smaller than the effective area of picture of a CRT. In the drawings, solid line indicates an effective area of picture, broken line indicates a screen raster, and hatching portion indicates a display area. As shown in the drawings, in the event of under scan, the display area is caused to be coincident to the screen raster, and in the event of over scan, the display area is caused to be coincident to the effective area of picture. To perform a convergence correction with respect to such a display area, in the event of under scan, it is necessary to perform the convergence correction with respect to a part of the effective area of picture.

Figure 13:
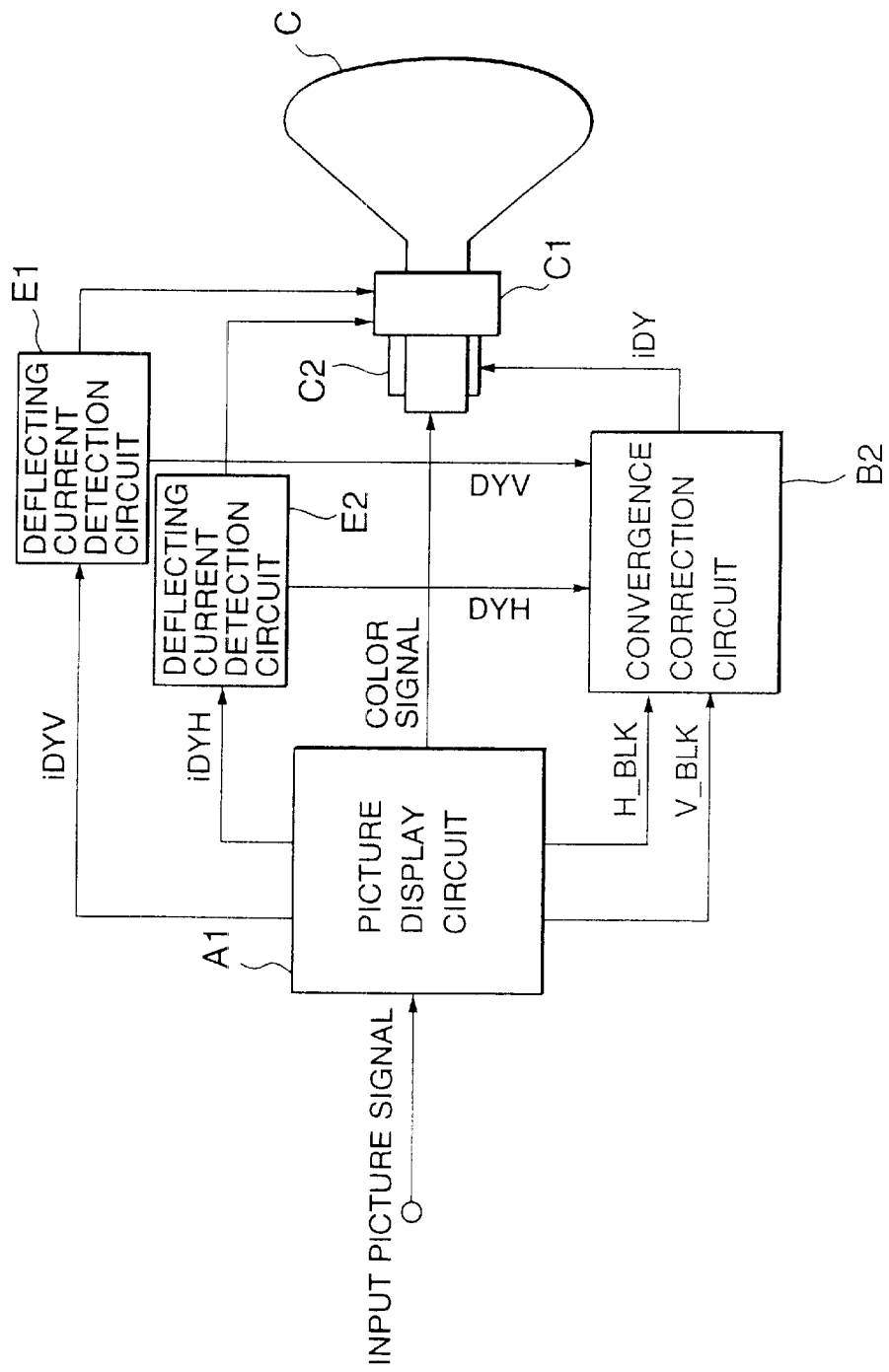
FIG. 13 is a block diagram schematically showing an arrangement of a display device according to example 4.

FIG. 13 is a block diagram schematically showing an arrangement of a display device according to this example 4. This display device comprises the display device shown in FIG. 1 to which deflecting current detection circuits E1 and E2 for detecting a current value of a deflecting current are added, and a digital convergence correction circuit B2 different form that in FIG. 1. The deflecting current detection circuit E1 outputs a detection signal DYV by detecting a vertical deflecting current iDYV, and the deflecting current detection circuit E2 outputs a detection signal DYH by detecting a horizontal deflecting current iDYH. Then, the convergence correction circuit B2 outputs a convergence correction signal iCY in accordance with the detection signals DYV and DYH.

Figure 14:
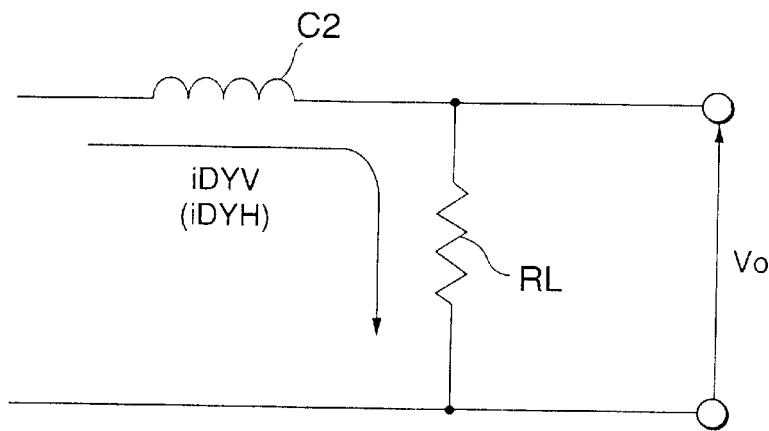
FIG. 14 is a diagram showing an example of an arrangement of deflecting current detection circuits E1 and E2 shown in FIG. 13.
Figure 15:
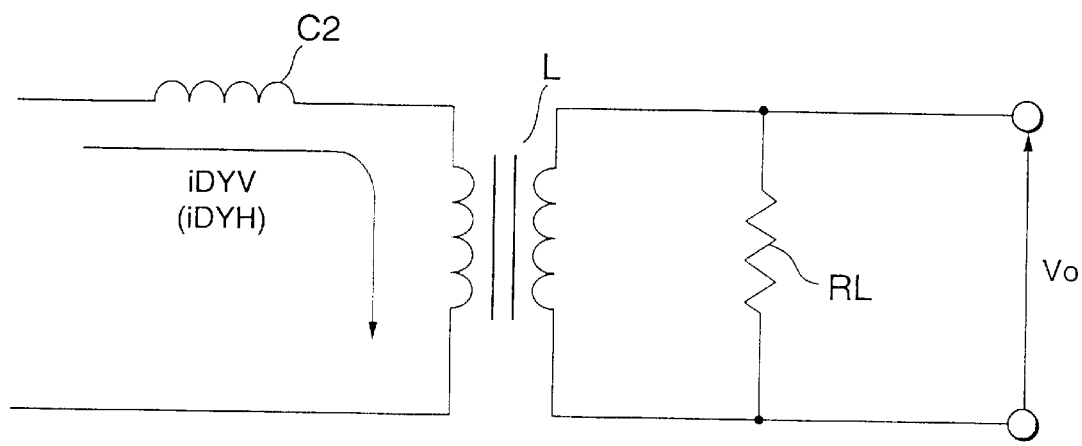
FIG. 15 is a diagram showing another example of an arrangement of the deflecting current detection circuits E1 and E2 shown in FIG. 13.

FIG. 14 is a diagram showing an example of an arrangement of the deflecting current detection circuits E1 and E2. In each of the deflecting current detection circuit, a detection resistor RL is inserted in series to the deflecting yoke C1, and the voltage between terminals of a detection resistor RL is caused to be a detection voltage V0. By using this circuit, the current flowing to the resistor RL, i.e., the currents iDYV and iDYH flowing through the deflecting yoke can be converted to the voltage values DYV and DYH. FIG. 15 is a diagram showing another example of an arrangement of the deflecting current detection circuits E1 and E2. In this deflecting current detection circuit, a coil on primary side of a current transformer L for detection is connected in series to the deflecting yoke C1 and the detection resistor RL is connected to secondary side. The voltage between the terminals of the detection resistor RL is caused to be a detection voltage V0. In this manner, the deflecting currents iDYV and iDYH can be converted to the voltage values DYV and DYH.

Figure 16:
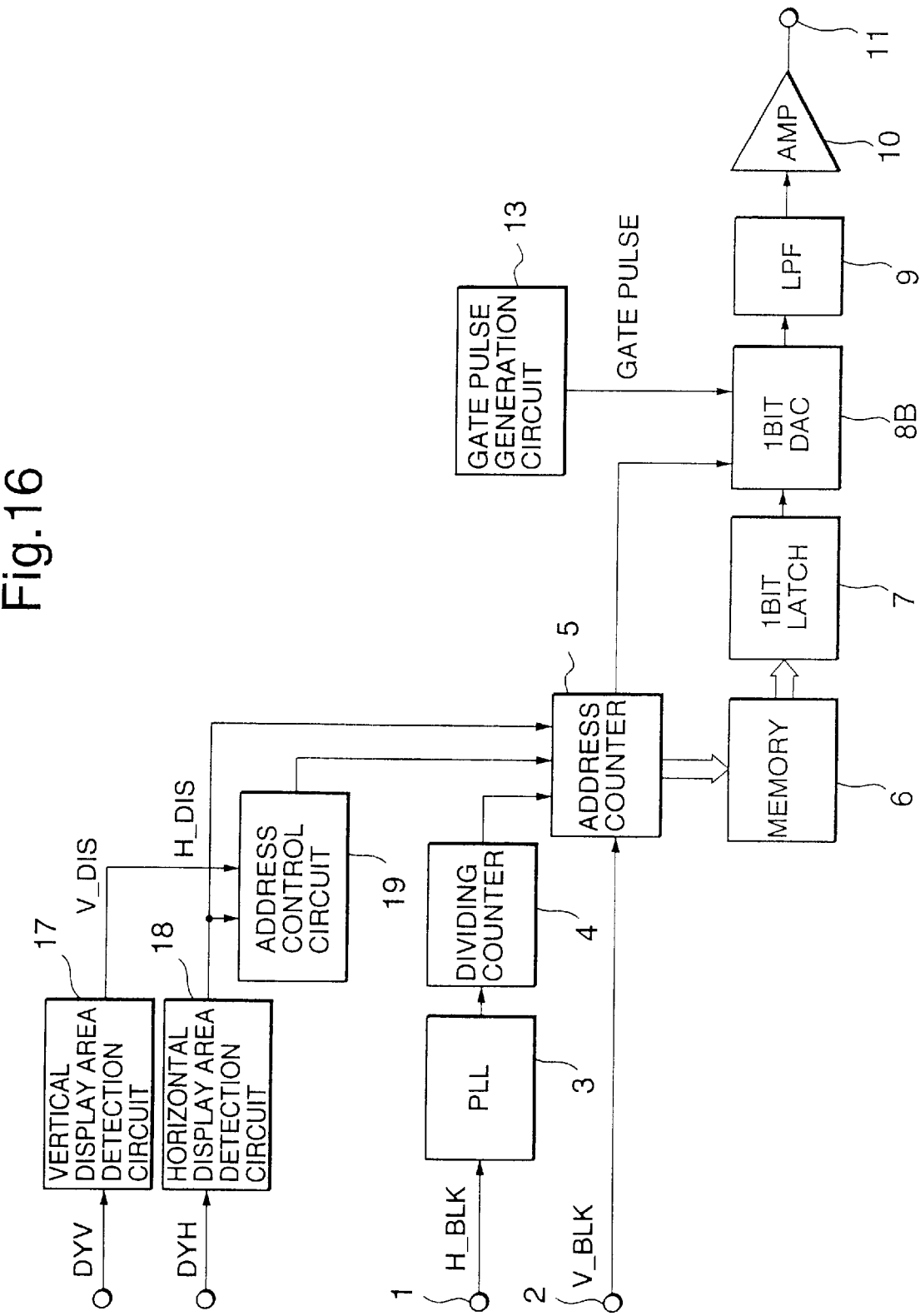
FIG. 16 is a block diagram showing an example of an arrangement of a convergence correction circuit B2 shown in FIG. 13.

FIG. 16 is a block diagram showing an example of an arrangement of a convergence correction circuit B2 shown in FIG. 13. This convergence correction circuit comprises the convergence correction circuit shown in FIG. 2 to which a vertical display area detection circuit 17 for outputting a vertical display area detection signal V_DIS, a horizontal display area detection circuit 18 for outputting a horizontal display area detection signal H_DIS, and an address control circuit 19 for controlling the address counter 5 are added, and a 1 bit DAC (8B) different from that in FIG. 2.

Figure 17:
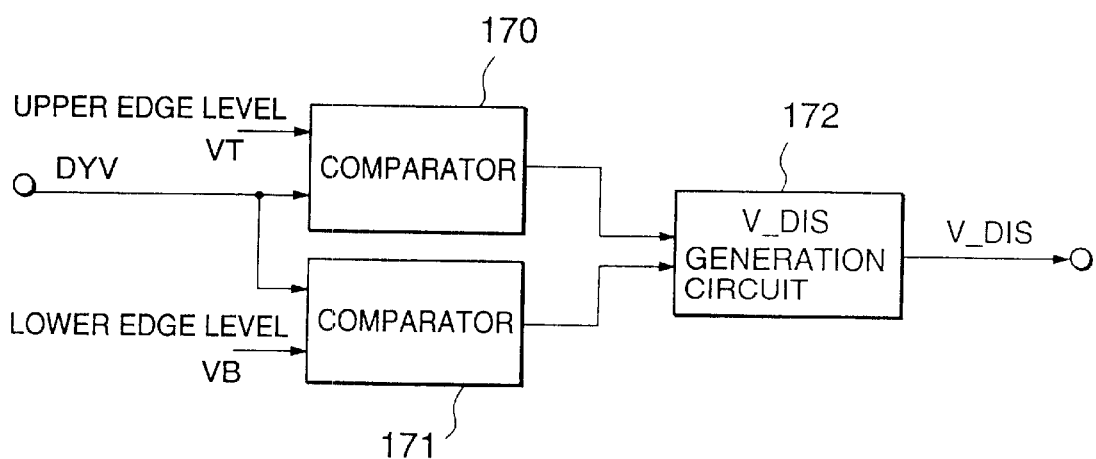
FIG. 17 is a diagram showing an example of an arrangement of a vertical display area detection circuit 17 shown in FIG. 16.
Figure 18:
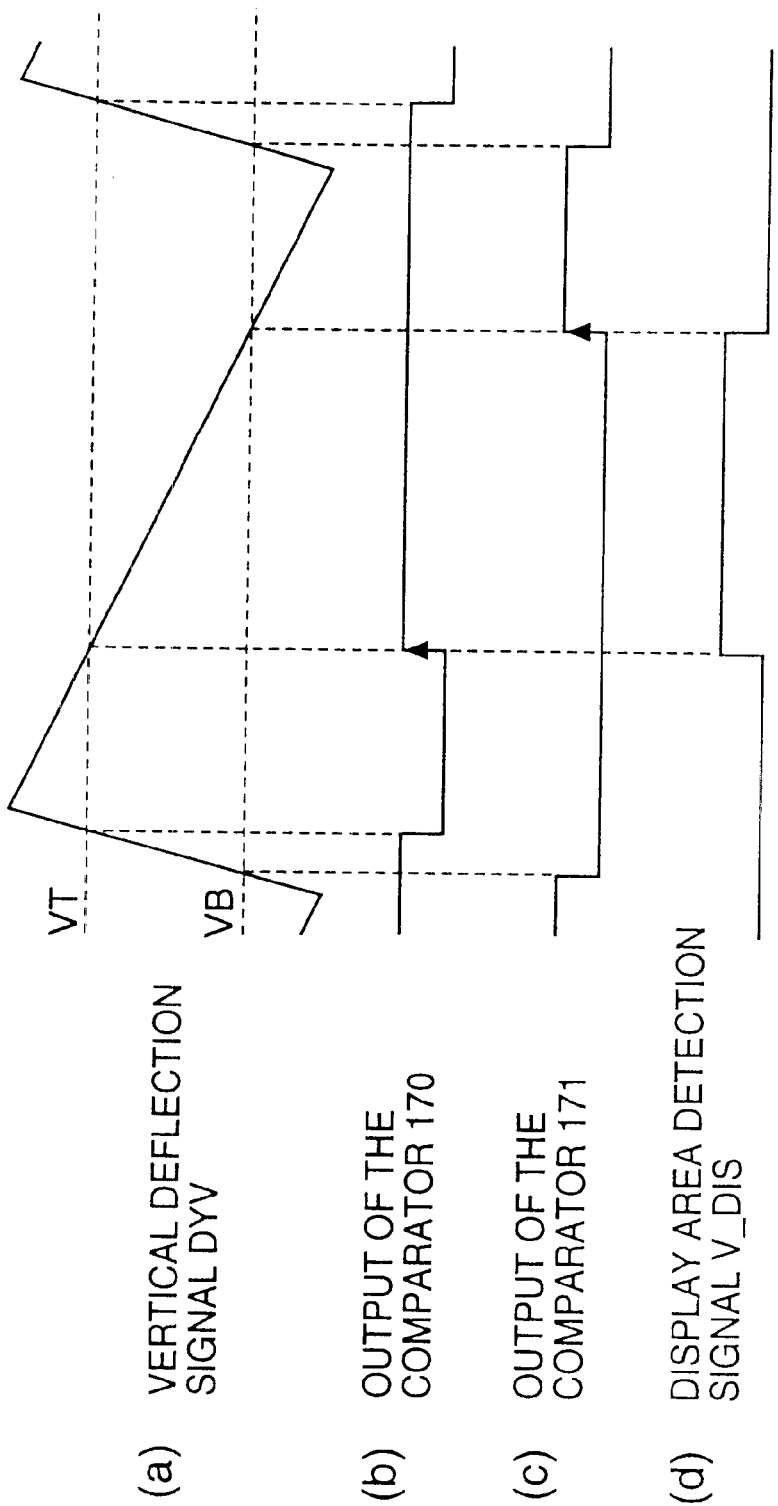
FIG. 18 is a diagram showing an example of a variation in each signal of the vertical display area detection circuit 17 shown in FIG. 17.
Figure 19:
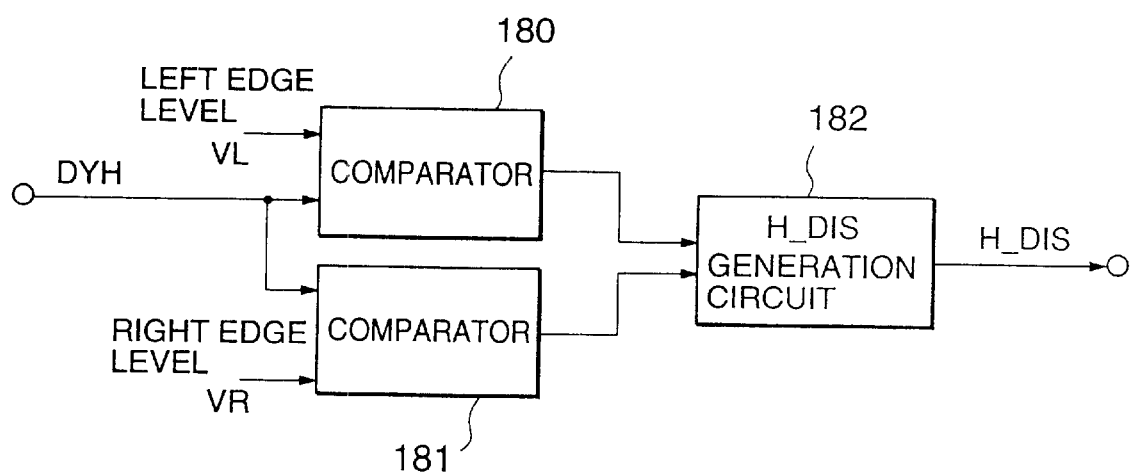
FIG. 19 is a diagram showing an example of an arrangement of a horizontal display area detection circuit 18 shown in FIG. 16.

The vertical display area detection circuit 17 generates the vertical display area detection signal V_DIS corresponding to the display area in vertical direction in accordance with the detection signal DYV of the vertical deflecting current. The horizontal display area detection circuit 18 generates the horizontal display area detection signal H_DIS corresponding to the display area in horizontal direction in accordance with the detection signal DYH of the horizontal deflecting current. FIG. 17 is a diagram showing an example of an arrangement of a vertical display area detection circuit 17. In this drawing, reference numerals 170 and 171 indicate comparators, and numeral 172 indicates a V_DIS generation circuit. FIG. 18 is a diagram showing an example of a variation in each signal. In this drawing, (a) indicates the detection signal DYV, (b) indicates the output of the comparator 170, (c) indicates the output of the comparator 171, and (d) indicates the vertical display area detection signal V_DIS. The detection signal DYV of the vertical deflecting current is compared with a level VT corresponding to the upper edge of the display area in the comparator 170, and compared with a level VB corresponding to the lower edge of the display area in the comparator 171. Then, in accordance with the result of comparison, the V_DIS generation circuit generates the vertical display area detection signal V_DIS corresponding to the display area in vertical direction. FIG. 19 is a diagram showing an example of an arrangement of the horizontal display area detection circuit 18. In the drawing, reference numerals 180 and 181 indicate comparators, and numeral 182 indicates a H_DIS generation circuit. FIG. 20 is a diagram showing an example of a variation in each signal. In the drawing, (a) indicates the detection signal DYH, (b) indicates the output of the comparator 180, (c) indicates the output of the comparator 181, and (d) indicates the horizontal display area detection signal H_DIS. The detection signal DYH of the horizontal deflecting current is compared with a level VL corresponding to the left edge of the display area in the comparator 180, and compared with a level VR corresponding to the right edge of the display area in the comparator 181. Then, in accordance with the result of comparison, the H_DIS generation circuit generates the horizontal display area detection signal H_DIS corresponding to the display area in horizontal direction. Each of these comparative levels VT, VB, VR and VL is controlled and set by a microcomputer not shown.

Figure 21A:
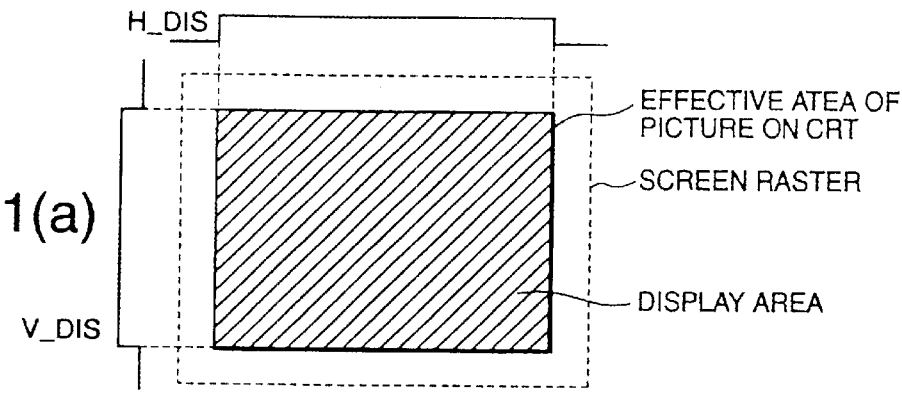
FIGS. 21(a) to (c) are explanatory views of a vertical display area detection signal V_DIS and a horizontal display area detection signal H_DIS.
Figure 21B:
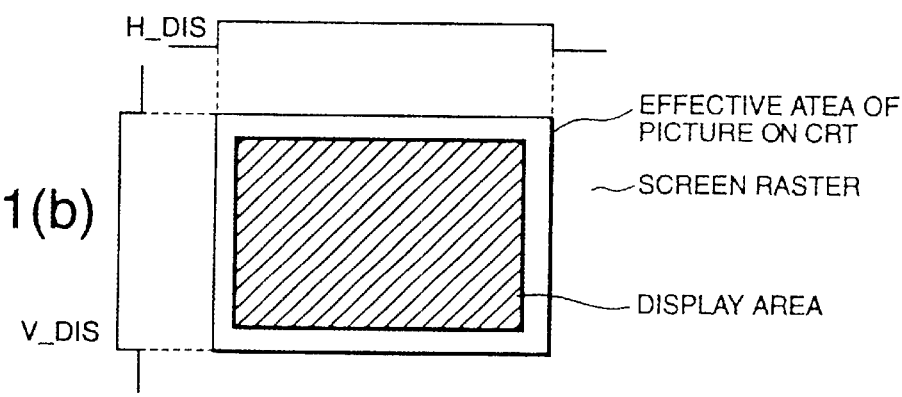
Figure 21C:
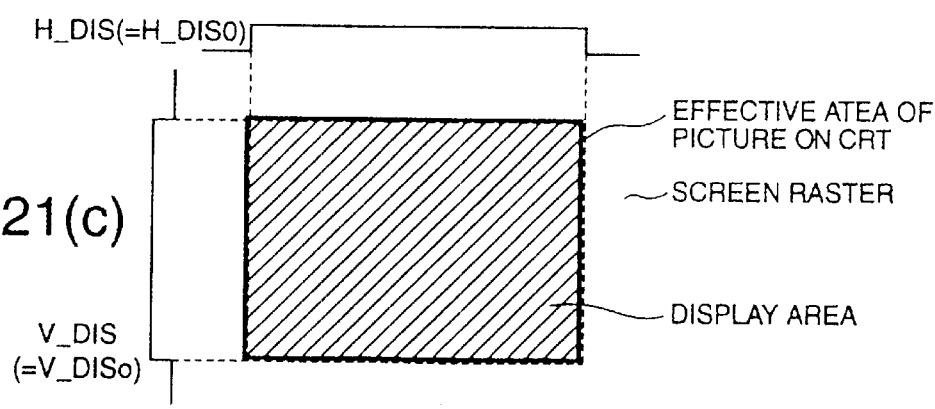

FIGS. 21(a) to (c) are explanatory views of a vertical display area detection signal V_DIS and a horizontal display area detection signal H_DIS. FIG. 21(a) shows an over scan, FIG. 21(b) shows an under scan, and FIG. 21(c) shows that a screen raster is coincident to an effective area of picture. In every drawing, with respect to the vertical display area detection signal V_DIS, the time base coincident to the scale of vertical scan is indicated in vertical direction. And with respect to the horizontal display area detection signal H_DIS, the time base coincident to the scale of horizontal scan is indicated in horizontal direction. In the event of FIGS. 21 (b) and (c), it is sufficient for the microcomputer for controlling each comparison level to establish the comparison levels VT and VB as a maximum value and a minimum value of the detection signal DYV respectively, and to establish the comparative levels VL and VR as a maximum value and a minimum value of the detection signal DYH respectively. On the other hand, in the event of FIG. 21(a), it is necessary to generate a vertical effective picture area signal V_DIS0 corresponding to the effective area of picture in vertical direction as the vertical display area detection signal V_DIS. It is also necessary to generate a horizontal effective picture area signal H_DIS0 corresponding to the effective area of picture in horizontal direction as the horizontal display area detection signal H_DIS. For that purpose, in the event of FIG. 21(c) in which the screen raster and the effective area of picture are coincident, the microcomputer stores preliminarily the data of the vertical effective picture area signal V_DIS0 and the data of the horizontal effective picture area signal H_DIS0. Then, using these data, the microcomputer performs a control of each comparison level in the state of over scan. That is, in the event of over scan, the comparison levels VT and VB of the vertical display area detection circuit 17 are controlled so that the vertical display area detection signal V_DIS is coincident to the data of the vertical effective picture area signal V_DIS0. And the comparison levels VL and VR of the horizontal display area detection circuit 18 are controlled so that the horizontal display area detection signal H_DIS is coincident to the data of the horizontal effective picture area signal H_DIS0.

Figure 22A:
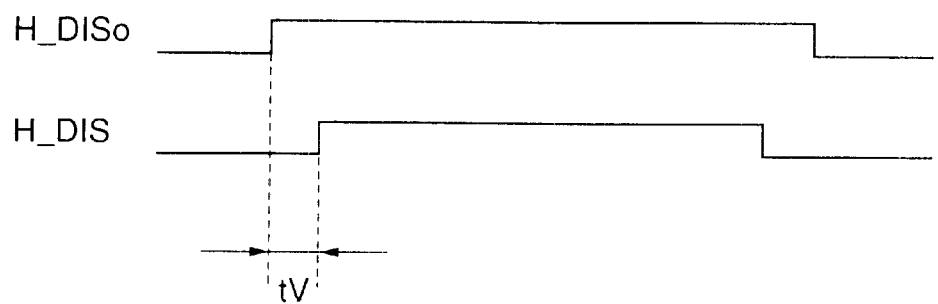
FIGS. 22(a) and (b) are explanatory views to explain an operation of the address control circuit 19 in the state of under scan.
Figure 22B:
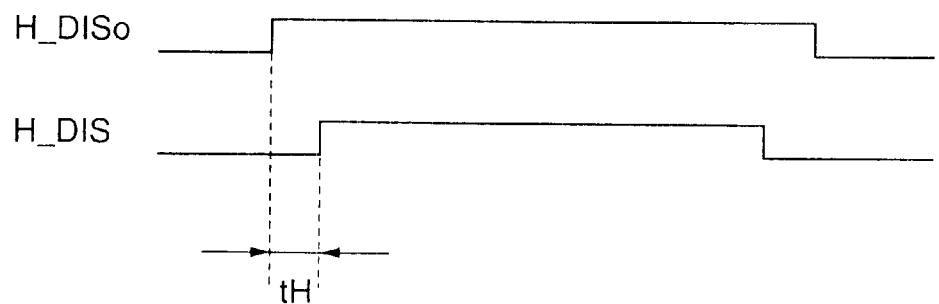
FIG. 22(b) shows a time lag in timing in horizontal direction.

The address control circuit 19 controls the address counter 5 so that the correction data of a part of the memory 6 is read out in the event of under scan. This control is performed in accordance with the preliminarily stored data of the vertical effective picture area signal V_DIS0, the preliminarily stored data of the horizontal effective picture area signal H_DIS0, the vertical display area detection signal V_DIS from the vertical display area detection circuit 17, and the horizontal display area detection signal H_DIS from the horizontal display area detection circuit 18. First, the address control circuit 19 obtains a time lag tV between the first transition of the vertical display area detection signal V_DIS and the first transition of the vertical effective picture area signal V_DIS0, and converts the obtained time lag to an interval number nV of the convergence correction points in vertical direction. The address control circuit 19 obtains also a time lag between the first transition of the horizontal display area detection signal H_DIS and the first transition of the horizontal effective picture area signal H_DIS0, and converts the obtained time lag to an interval number nH (i.e., number of system clocks) of the convergence correction points in horizontal direction. FIGS. 22(a) and (b) are diagrams each showing such a state.

In accordance with the result, the address control circuit 19 supplies a readout address to the address counter 5. An address of the correction data corresponding to a convergence correction point which is (nV+1) th in vertical direction and (nH+1) th in horizontal direction is outputted to the address counter 5. Also on the left edge of the screen raster, an address obtained by skipping nH convergence correction points in horizontal direction is outputted to the address counter 5. The address counter 5 increments the addresses in order synchronously with the system clocks until the horizontal display area detection signal H_DIS varies to a low level after the address is set by the address control circuit 19. In the event of over scan, as all correction data of the memory 6 are read out, it is not necessary for the address control circuit 19 to control the address counter 5.

Figure 23A:
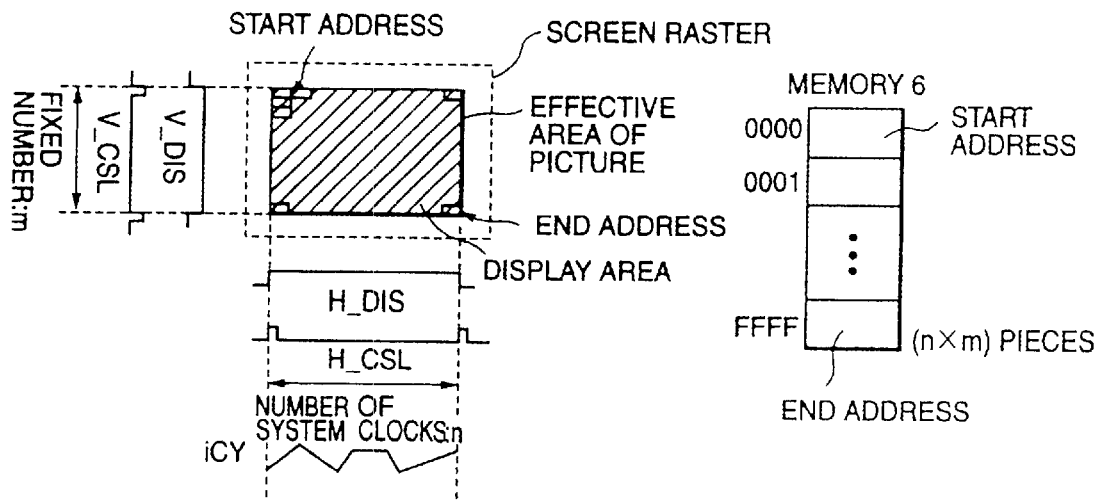
FIGS. 23(a) and (b) are diagrams each showing an example of a relation between a display area and correction data in the memory 6 (memory address mapping).
Figure 23B:
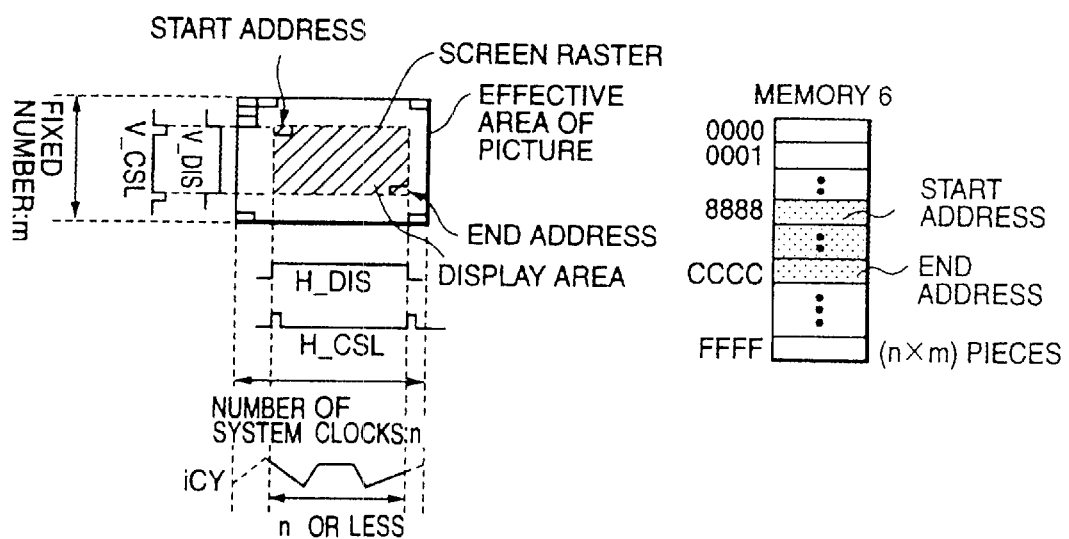
FIG. 23(b) shows a memory address mapping in the state of under scan.

FIGS. 23(a) and (b) are diagrams each showing an example of a relation between a display area and correction data in the memory 6 (memory address mapping) at the time of the mentioned operation. FIG. 23(*a*) shows a memory address mapping in the state of over scan, and FIG. 23(*b*) shows a memory address mapping in the state of under scan. In the state of over scan, the convergence correction is performed with respect to the entire effective area of picture on the CRT, and all correction data stored in the memory 6 are utilized. On the other hand, in the state of under scan, the convergence correction is performed with respect to the entire screen raster, i.e., with respect to a part of the effective area of picture, and only a part of the correction data stored in the memory 6 is utilized. In the drawings, it is shown that the memory 6 stores the correction data for all convergence correction points on the effective area of picture in the addresses 0000h to FFFFh, and in the state of under scan, only the data of the addresses 8888h to CCCCh are used.

FIG. 24 is a block diagram showing an example of an arrangement of a 1 bit DAC (8B). This 1 bit DAC comprises the 1 bit DAC (8) shown in FIG. 10 to which an initial value generation circuit 85, a DAC (86) and a current addition circuit 87 are added, and the address is supplied from the address counter 5. The initial value generation circuit 85 generates a convergence correction amount on the left edge of the screen raster in the state of under scan or a convergence correction amount on the left edge of the effective area of picture in the state of over scan as initial value data in accordance with the address from the address counter. This convergence correction amount is a value obtained for each variation in the scanning frequency, and is an integration value of the correction data between the left edge of the effective area of picture and the left edge of the screen raster. The convergence correction amount is stored in the memory of a voltage generation circuit. The initial value data from the initial value generation circuit 85 are converted to an analog signal and, being added to the output of the integration circuit 83 in the addition circuit 87, becomes an analog output signal.

Thus, in the event of over scan, the display device according to this example establishes the effective area of picture to be a display area and performs the convergence correction with respect to the effective area of picture. Therefore, each convergence correction point can correspond to the correction data read out from the memory.

In the event of under scan, the display device according to this example performs the convergence correction using a part of the correction data in the memory, i.e., using only the correction data corresponding to the convergence correction point in the screen raster. Therefore, each convergence correction point can correspond to the correction data read out from the memory.

Since the initial value of the correction amount is stored and held, even if the correction data are variable data of the convergence correction amount, a correct analog output signal can be outputted in the state of under scan.

This convergence correction device comprises the vertical display area detection circuit 17, the horizontal display area detection circuit 18, and the address control circuit 19. As a result, in the same manner as in example 4, the address counter 17 generates an address for the effective area of picture in the event of over scan, while generating an address corresponding to each convergence correction point in the screen rater in the event of under scan. Accordingly, it is possible to perform at all times a convergence correction corresponding to the relation between the screen raster and the effective area of picture.

As described in example 1, even in the event of variation in scanning frequency, this convergence correction device can perform a desired convergence correction with respect to each convergence correction point corresponding to a position on the CRT screen in a relation of 1 to 1. As a result, even if the relation between the screen raster and the effective area of picture varies due to the variation in scanning frequency, it is possible to perform a desired convergence correction. Further, not only in the event of the variation between the screen raster and the effective area of picture due to the variation in scanning frequency, but also in the event of the same scanning frequency, when the relation between the screen raster and the effective area of picture is different, a desired convergence correction can be performed.

Though the convergence correction in the event of typical over scan and under scan has been described in this example 4, the convergence correction device is also applicable in the event that either horizontal direction or vertical direction is in the state of over scan while the other is in the state of under scan.

EXAMPLE 5

In this example, a convergence correction device capable of easily obtaining data of the vertical effective picture area signal V_DIS0 and data of horizontal effective area signal H_DIS0.

Figure 25:
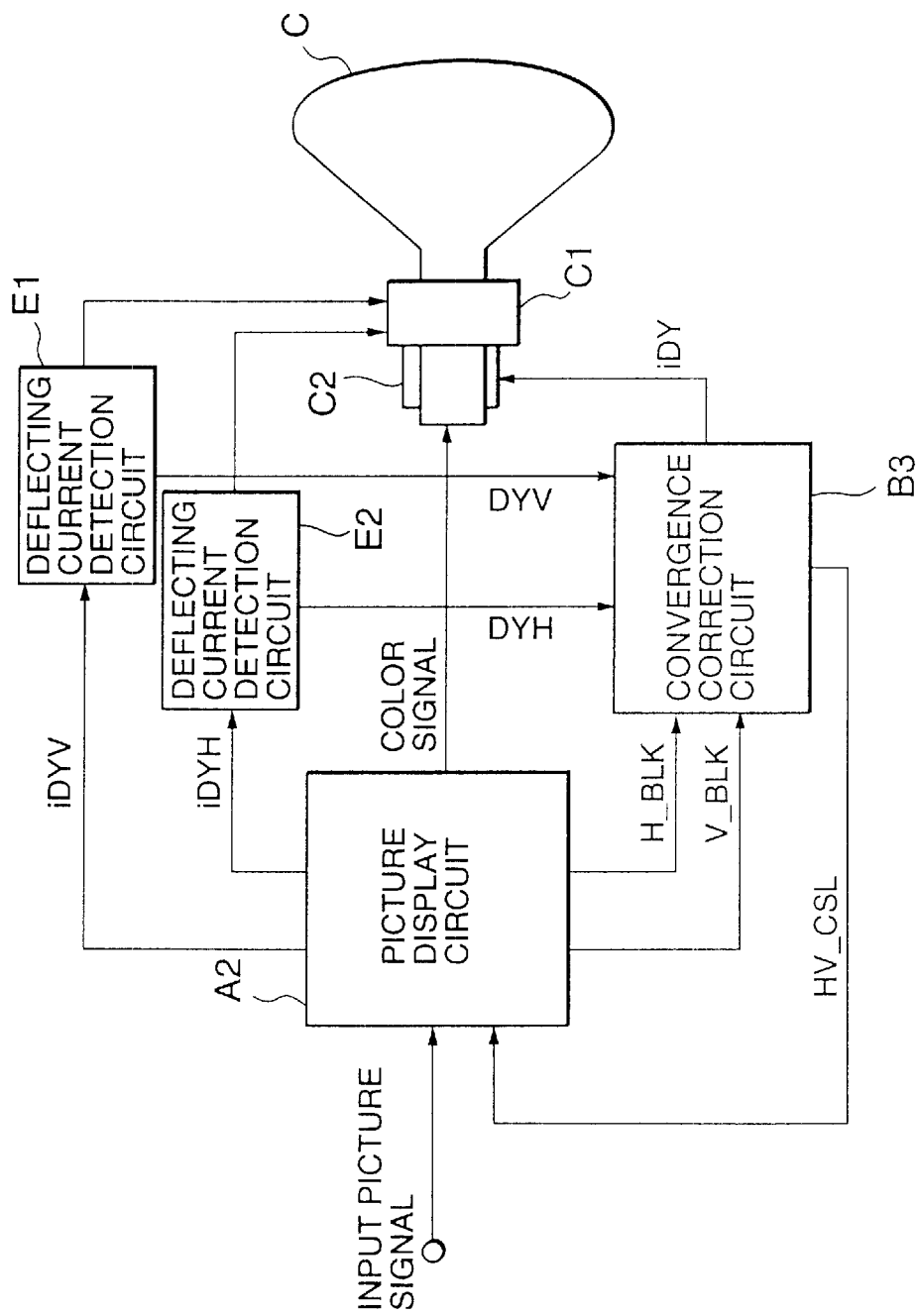
FIG. 25 is a block diagram schematically showing an arrangement of a display device according to example 5.

FIG. 25 is a block diagram schematically showing an arrangement of a display device according to example 5. This display device comprises the display device shown in FIG. 13 to which a picture display circuit A2 and a digital convergence correction circuit B3 different from those in FIG. 13 are added. A display area indication signal HV_CSL outputted from the convergence correction circuit B3 is inputted to a picture display circuit A1. And the picture signal display circuit A2 performs a picture display on the CRT (C) in accordance with either an input picture signal or a display area indication signal HV_CSL.

Figure 26:
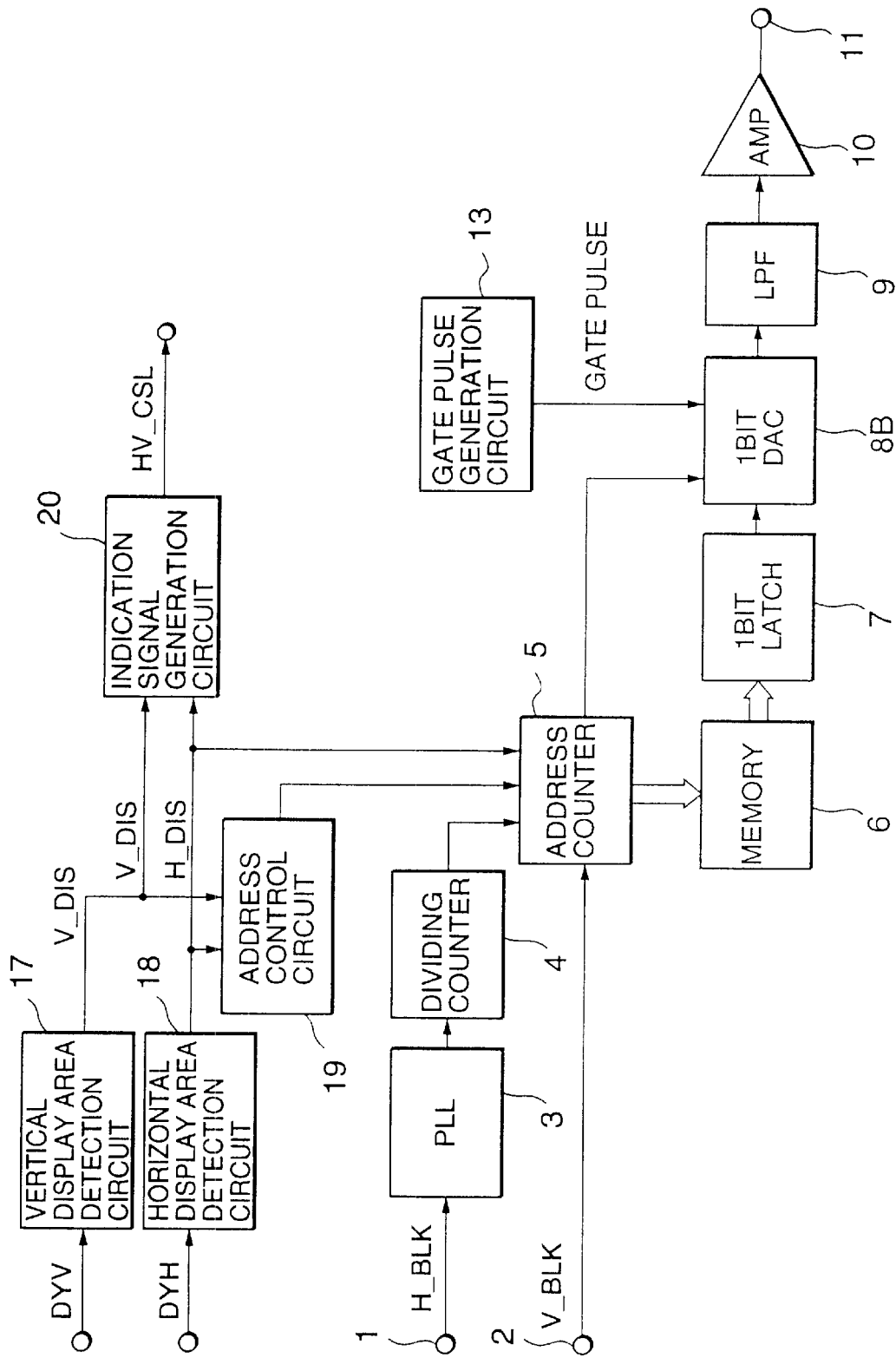
FIG. 26 is a block diagram showing an example of an arrangement of a digital convergence correction circuit B3 shown in FIG. 25.

FIG. 26 is a block diagram showing an example of an arrangement of the digital convergence correction circuit B3 shown in FIG. 25. This convergence correction circuit B3 comprises the convergence correction circuit shown in FIG. 16 to which an indication signal generation circuit 20 is added. The indication signal generation circuit 20 generates the display area indication signal HV_CSL for displaying a display area on the screen in accordance with the vertical display area detection signal V_DIS and the horizontal display area detection signal H_DIS.

Figure 27:
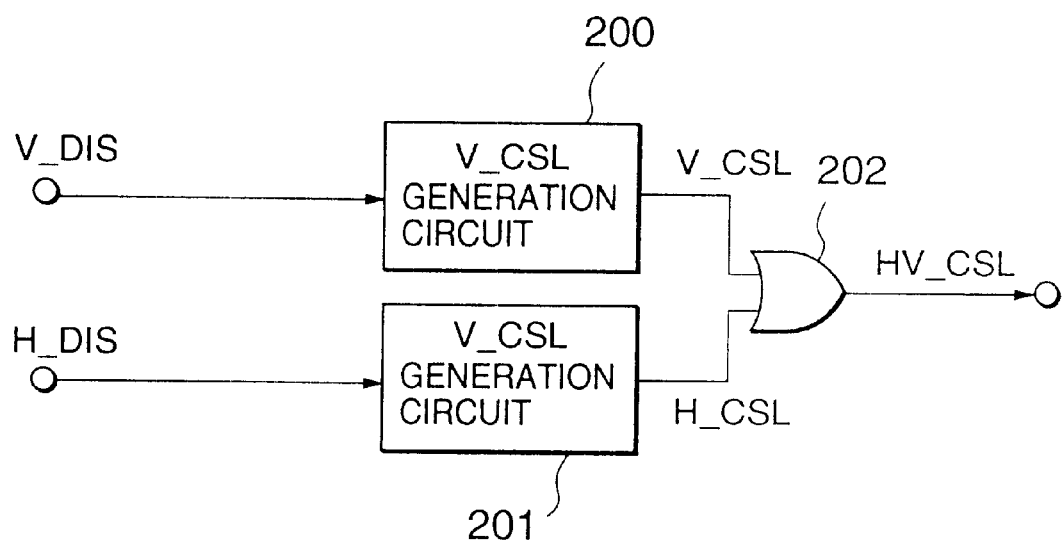
FIG. 27 is a block diagram showing an example of an arrangement of an indication signal generation circuit 20 shown in FIG. 26.

FIG. 27 is a block diagram showing an example of an arrangement of the indication signal generation circuit 20. In the drawing, reference numeral 200 indicates a V_CSL generation circuit, numeral 201 indicates a H_CSL generation circuit, and numeral 202 indicates an OR operation circuit.

The V_CSL generation circuit 200 outputs the vertical display area indication signal V_CSL comprising pulses corresponding to two edges, i.e., upper edge and lower edge of the display area in vertical direction at the time of variation in the vertical display area detection signal V_DIS. Each pulse included in this vertical display area indication signal V_CSL has a pulse duration sufficiently short as compared with field period. In particular, it is preferable that each pulse has a pulse duration equivalent to the horizontal scanning period.

The H_CSL generation circuit 201 outputs the horizontal display area indication signal H_CSL comprising pulses corresponding to two edges, i.e., left edge and right edge of the display area in horizontal direction at the time of variation in the horizontal display area detection signal H_DIS. Each pulse included in this horizontal display area indication signal H_CSL has a pulse duration sufficiently short as compared with the horizontal scanning period. In particular, it is preferable that each pulse has a pulse duration equivalent to the system clock period.

Figure 28:
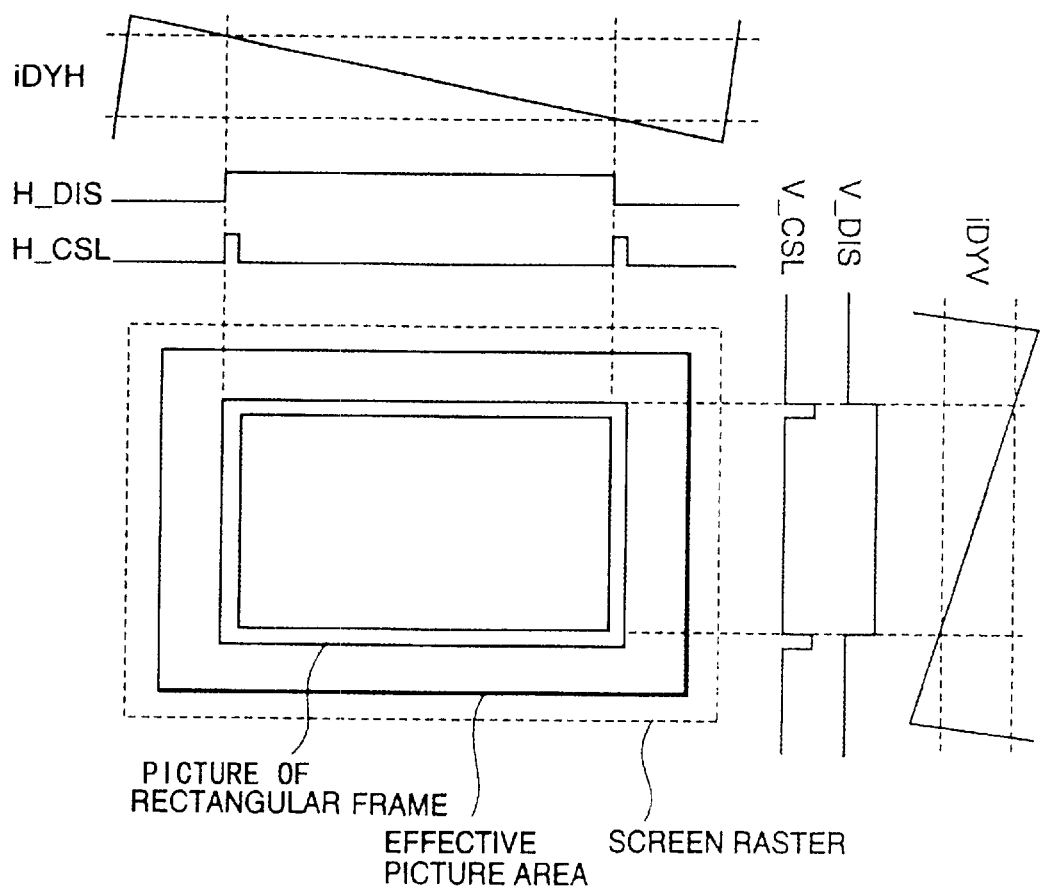
FIG. 28 shows that a picture display circuit A2 shown in FIG. 25 displays a display area indication signal HV_CSL on a CRT screen, together with principal signals.

The OR operation circuit 202 mixes the vertical display area indication signal V_CSL and the horizontal display area indication signal H_CSL, and outputs a display area indication signal HV_CSL corresponding to the peripheral edge of the display area. The picture display circuit A2 displays this display area indication signal HV_CSL on the CRT screen as a picture. That is, a picture of rectangular frame shape showing the peripheral edge of the display area is displayed. FIG. 28 shows a relation among these signals, and shows a manner that the picture display circuit A2 displays the display area indication signal HV_CSL on the CRT screen.

Described hereinafter is a method for obtaining the data of the vertical effective picture area signal V_DIS0 and the data of the horizontal effective picture area signal H_DIS0 stored in the address control circuit 19. First, an input picture signal is put into a state of over scan by changing screen size of the display device or the like. At this time, each comparison level VT, VB, VL and VR to be controlled by the microcomputer is set to a value adapted for displaying all or part of a rectangular frame of the display area indication signal HV_CSL on the screen. As a result, the rectangular frame is displayed on the CRT screen by the picture display circuit A2. In this manner, an operator watching the rectangular frame displayed on the screen makes a control of the comparison levels VT and VB in the vertical display area detection circuit 17 and the comparison levels VL and VR in the horizontal display area detection circuit 18, so that the rectangular frame is coincident to the peripheral edge of the effective area of picture. This control is performed through a microcomputer not shown.

By causing the peripheral edge of the display area to coincide with the peripheral edge of the effective area of picture, it is possible to output the vertical effective picture area signal V_DIS0 from the vertical display area detection circuit 17 and to output the horizontal effective picture area signal H_DIS0 from the horizontal display area detection circuit 18. Accordingly, the data can be obtained just by storing the output signal of the vertical display area detection circuit 17 obtained at this time as data of the vertical effective picture area signal V_DIS0 and by storing the output signal of the horizontal display area detection circuit 18 as data of the horizontal effective picture area signal H_DIS0.

By adopting the above arrangement, the convergence correction device according to this example can easily obtain the data of the vertical effective picture area signal V_DIS0 and the data of the horizontal effective picture area signal H_DIS0.

Though the indication signal generation circuit 20 outputs the display area indication signal HV_CSL obtained by mixing the vertical display area indication signal V_CSL and the horizontal display area indication signal H_CSL in this example, it is also preferable that either the vertical display area indication signal V_CSL or the horizontal display area indication signal H_CSL is selectively outputted to obtain the data of the vertical effective picture area signal V_DIS0 and the data of the horizontal effective picture area signal H_DIS0 in this order.

EXAMPLE 6

Described in this example is a display device comprising the display device according to example 5 (FIG. 25) and capable of preventing any disorder in picture display due to a disorder in the convergence correction signal even if the scanning frequency of the input picture signal varies.

Figure 29:
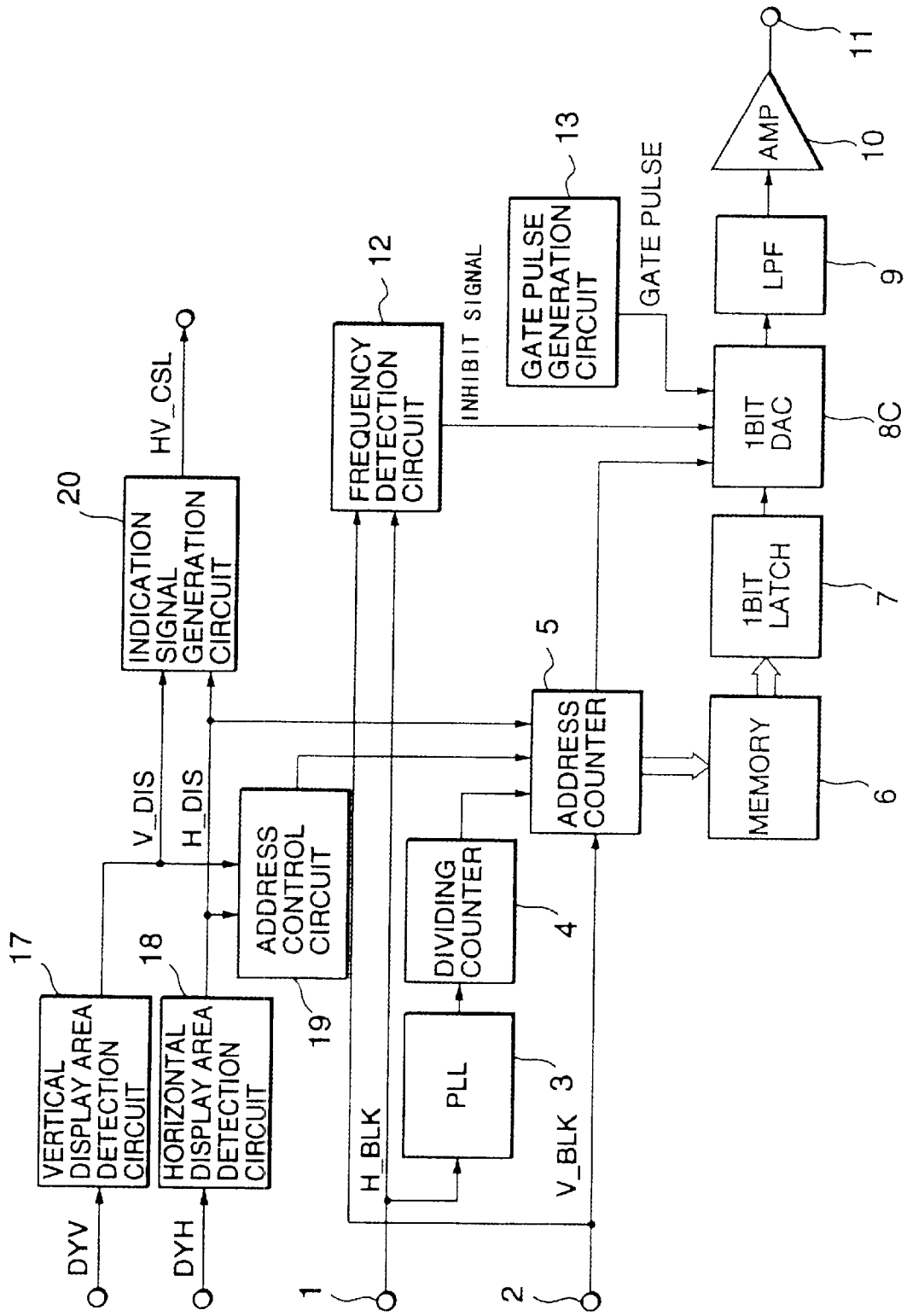
FIG. 29 is a diagram showing an example of an essential part of a display device according to example 6, and is a block diagram showing another example of an arrangement of the digital convergence correction device B3 shown in FIG. 25.

FIG. 29 is a diagram showing an example of an essential part of the display device according to this example, and is a block diagram showing another example of an arrangement of the digital convergence correction device shown in FIG. 25.

Figure 30:
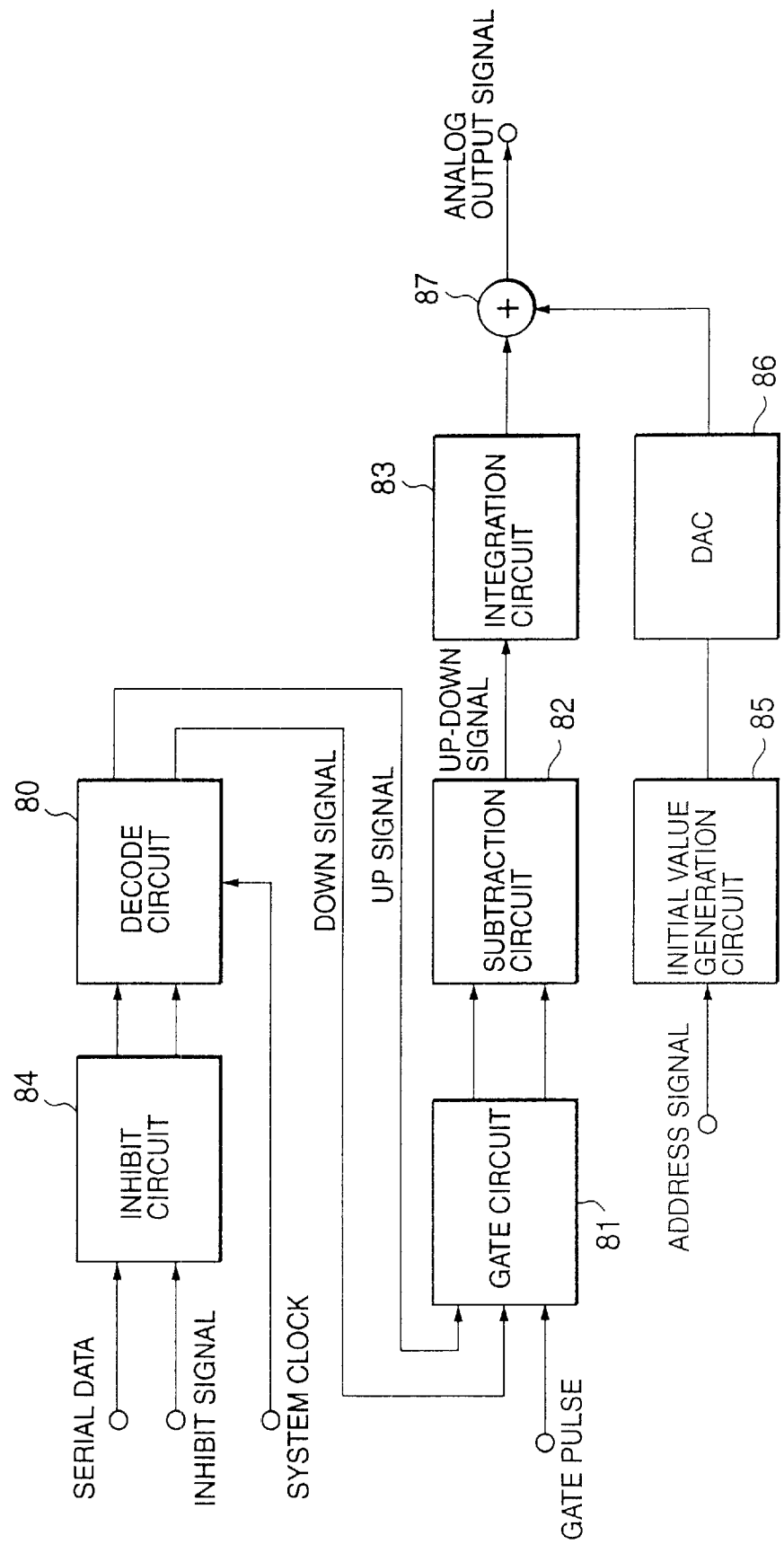
FIG. 30 is a block diagram showing an example of an arrangement of a 1 bit DAC (8C) shown in FIG. 29.

This convergence correction device comprises the convergence correction device shown in FIG. 26 to which a frequency detection circuit 12 is added, and a 1 bit DAC (8C) different from that in FIG. 26. This frequency detection circuit 12 is a circuit same as that shown in FIG. 9. FIG. 30 is a block diagram showing an example of an arrangement of the 1 bit DAC (8C) shown in FIG. 29. This 1 bit DAC (8C) comprises the 1 bit DAC (8B) shown in FIG. 24 to which an inhibit circuit 84 is added. This inhibit circuit 84 is a circuit same as that shown in FIG. 10.

In the event of variation in scanning frequency, the frequency detection circuit 12 outputs an inhibit signal of a low level until the PLL 3 is reset and the system clock is stabilized. As a result, the inhibit circuit 84 fixes the up signal and the down signal to a low level, and the analog signal from the integration circuit 83 becomes constant. On the other hand, the DAC (86) outputs a constant analog signal in accordance with initial value data outputted by an initial value generation circuit 85. As a result, level of the analog output signal outputted from an addition circuit 87 is kept constant.

Consequently, also in the display device according to example 4 or 5, if the scanning frequency varies, level of the convergence correction signal can be kept constant until the PLL 3 is reset and the system clock is stabilized, and it becomes possible to prevent a disorder in picture display.

EXAMPLE 7

Described in this example is a display device capable of preventing any disorder in display picture due to sudden variation in convergence correction signal on the upper edge and on the lower edge of the screen raster in the state of under scan.

Figure 31:
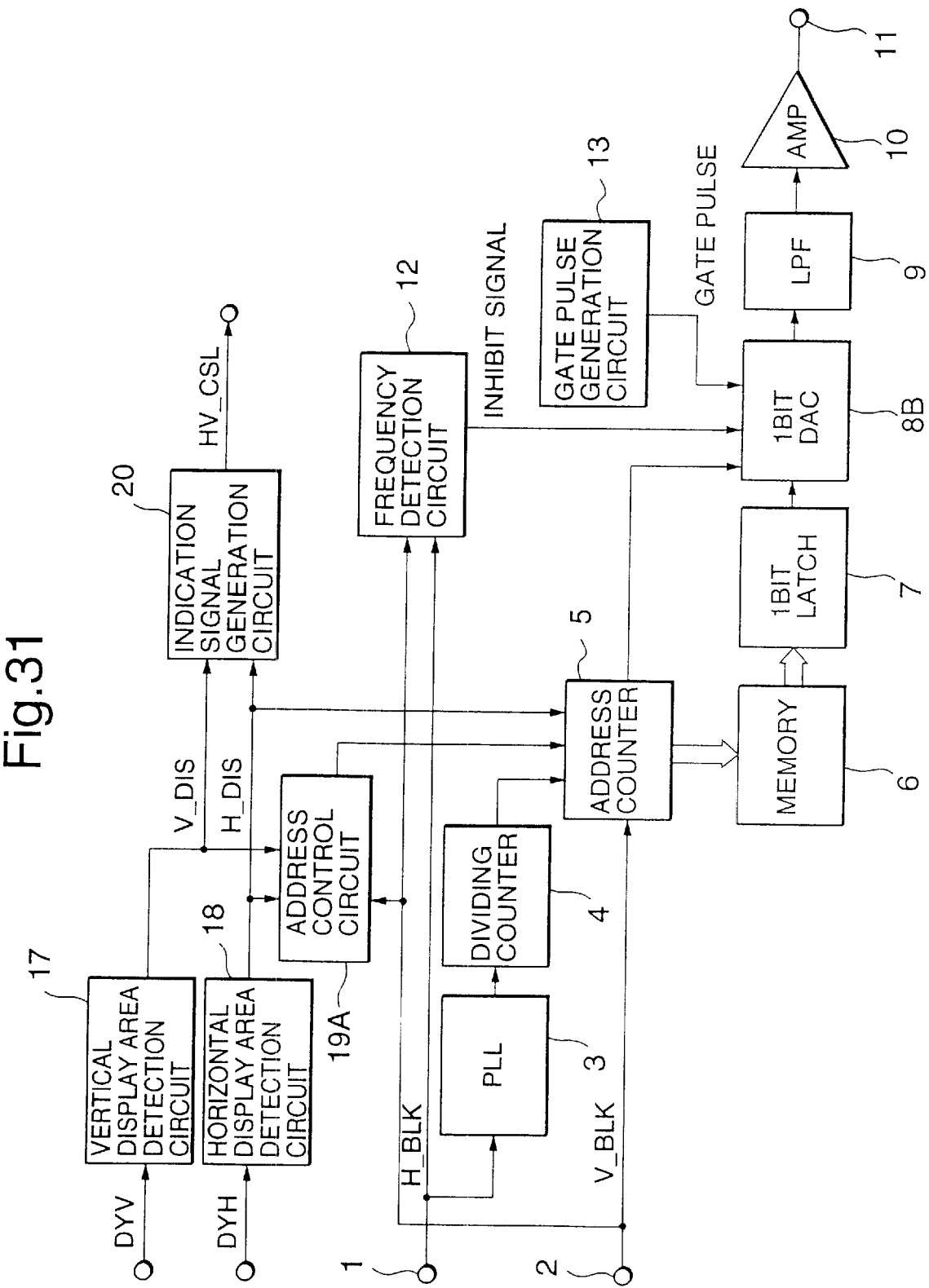
FIG. 31 is a diagram showing an example of an essential part of a display device according to example 7, and is a block diagram showing another example of an arrangement of the digital convergence correction device B3 shown in FIG. 25.

FIG. 31 is a diagram showing an example of an essential part of a display device according to this example 7, and is a block diagram showing another example of an arrangement of the digital convergence correction device B3 shown in FIG. 25. This convergence correction device comprises the convergence correction device shown in FIG. 29 to which an address control circuit 19A different from that in FIG. 29 is added.

Figure 32:
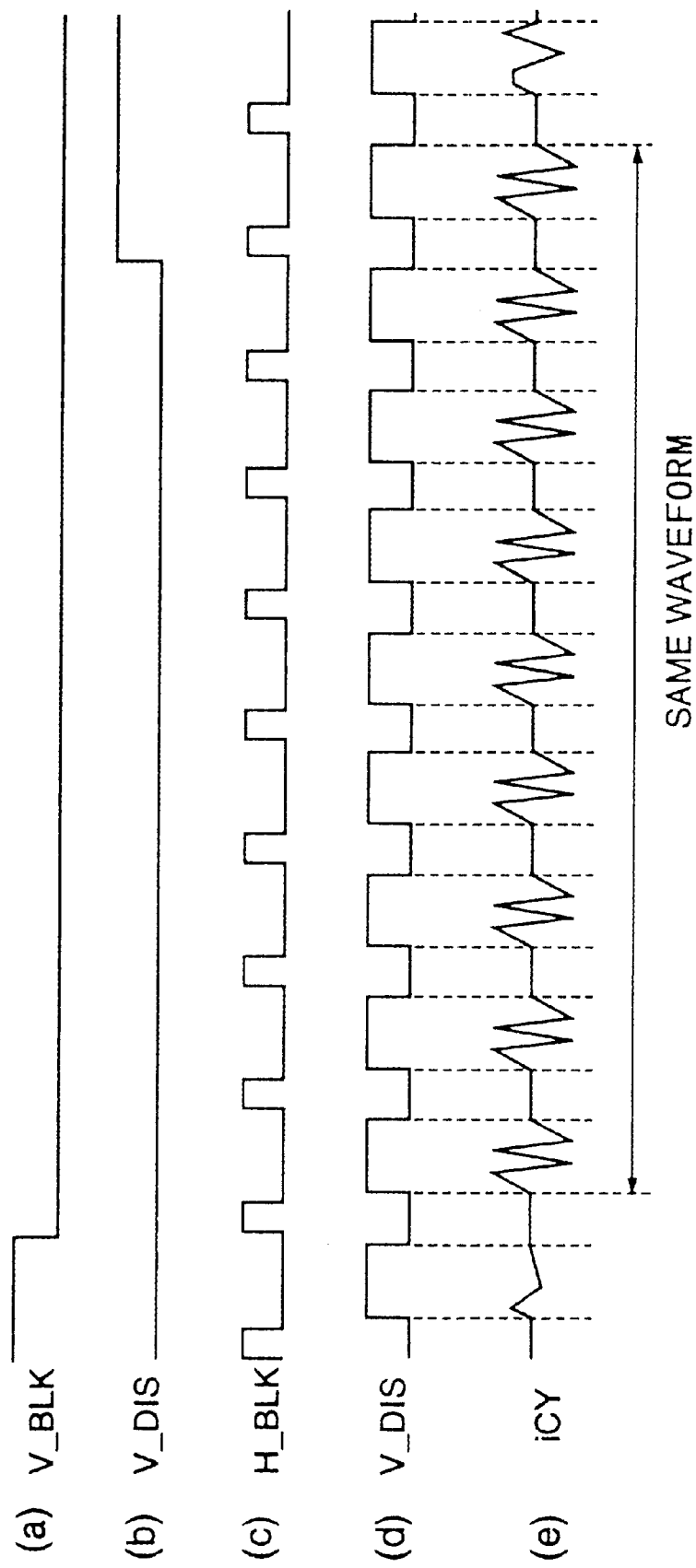
FIG. 32 is a timing chart to explain an example of an operation of an address control circuit 19A shown in FIG. 31, and shows a variation in principal signals from a first transition (leading edge) of a vertical blanking pulse V_BLK to a last transition (trailing edge) of a vertical display area detection signal V_DIS.
Figure 33:
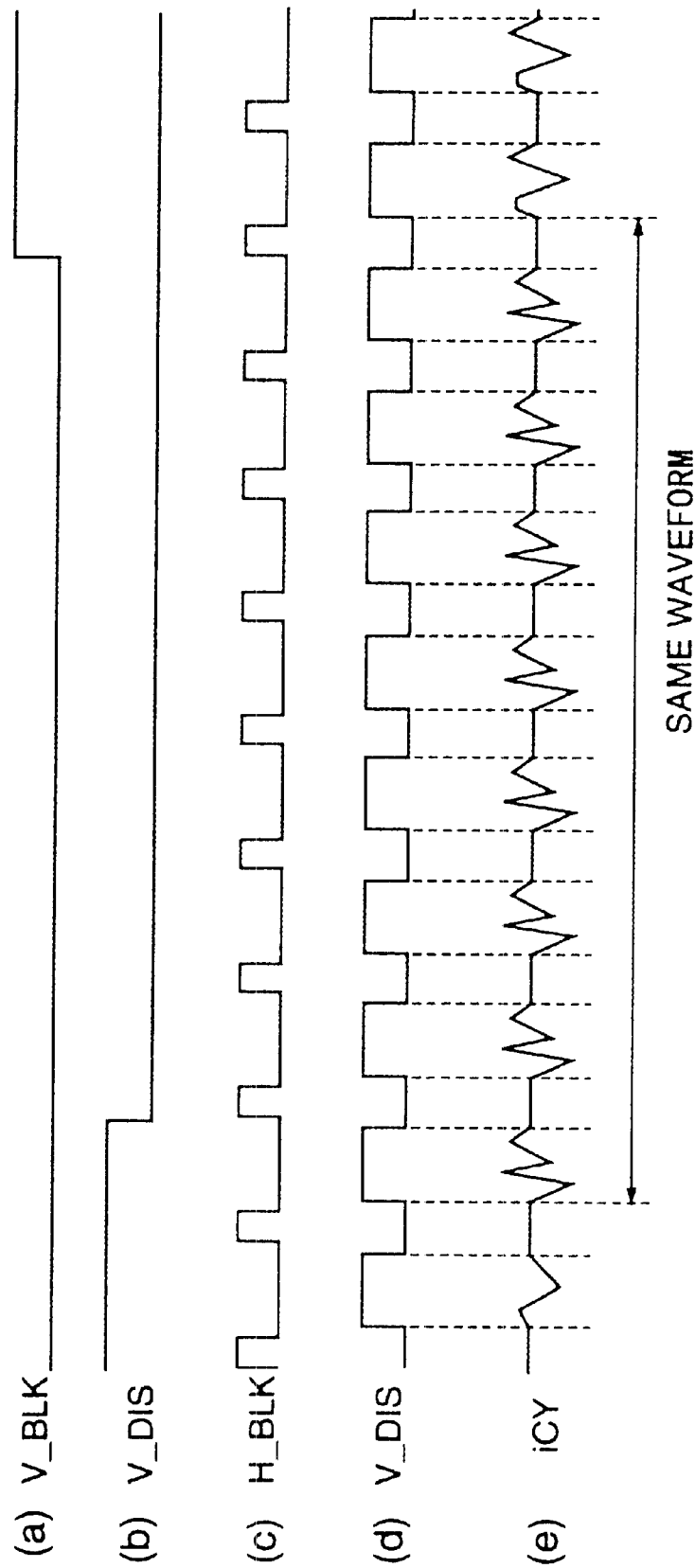
FIG. 33 is a timing chart to explain an example of an operation of the address control circuit 19A shown in FIG. 31, and shows a variation in principal signals from a last transition of the vertical blanking pulse V_DIS to a first transition of the vertical display area detection signal V_BLK.

FIGS. 32 and 33 are timing charts to explain an example of the operation of an address control circuit 19A shown in FIG. 31, and shows a variation in the event of under scan. In these drawings, (a) indicates a vertical blanking pulse V_BLK, (b) indicates a vertical display area detection signal V_DIS, (c) indicates a horizontal blanking pulse H_BLK, (d) indicates a horizontal display area detection signal H_DIS, and (e) indicates a convergence correction signal iCY that is a driving signal of the convergence yoke coil C2.

The address control circuit 19A outputs the same address to the address counter 5 for each horizontal scanning period, so that the same convergence correction is performed in every horizontal scanning period from a first transition of the vertical blanking pulse V_BLK to a first transition of the vertical display area signal V_DIS. This address is an address outputted first to the address counter 5 after the first transition of the vertical display area detection signal V_DIS. Accordingly, each of the correction data read out during the first one horizontal scanning period of the field is read out also during each horizontal scanning period after the first transition of the vertical display area detection signal V_DIS. FIG. 32 shows the state at this time. There is no variation in the convergence correction signal between the states before and after the variation in the first transition of vertical display area detection signal V_DIS, i.e., in the comparison between the first one horizontal scanning period of the field and the previous horizontal scanning period. Accordingly, it is possible to prevent a disorder in display picture on the upper edge of the effective area of picture or in the vicinity thereof due to sudden variation in convergence correction signal.

The address control circuit 19A outputs the same address to the address counter for each horizontal scanning period, so that the same convergence correction is performed in every horizontal scanning period until the last transition of the vertical display area detection signal V_DIS and first transition of the vertical blanking pulse V_BLK. This address is an address outputted finally to the address counter 5 before the last transition of the vertical display area detection signal V_DIS. Accordingly, each of the correction data read out during the first one horizontal scanning period of the field is read out also during each horizontal scanning period after the last transition of the vertical display area detection signal V_DIS. FIG. 33 shows the state at this time. There is no variation in the convergence correction signal between the states before and after the variation in the last transition of vertical display area detection signal V_DIS, i.e., in the comparison between the first one horizontal scanning period of the field and the previous horizontal scanning period. Accordingly, it is possible to prevent a disorder in display picture on the lower edge of the effective area of picture or in the vicinity thereof due to sudden variation in convergence correction signal.

Figure 34:
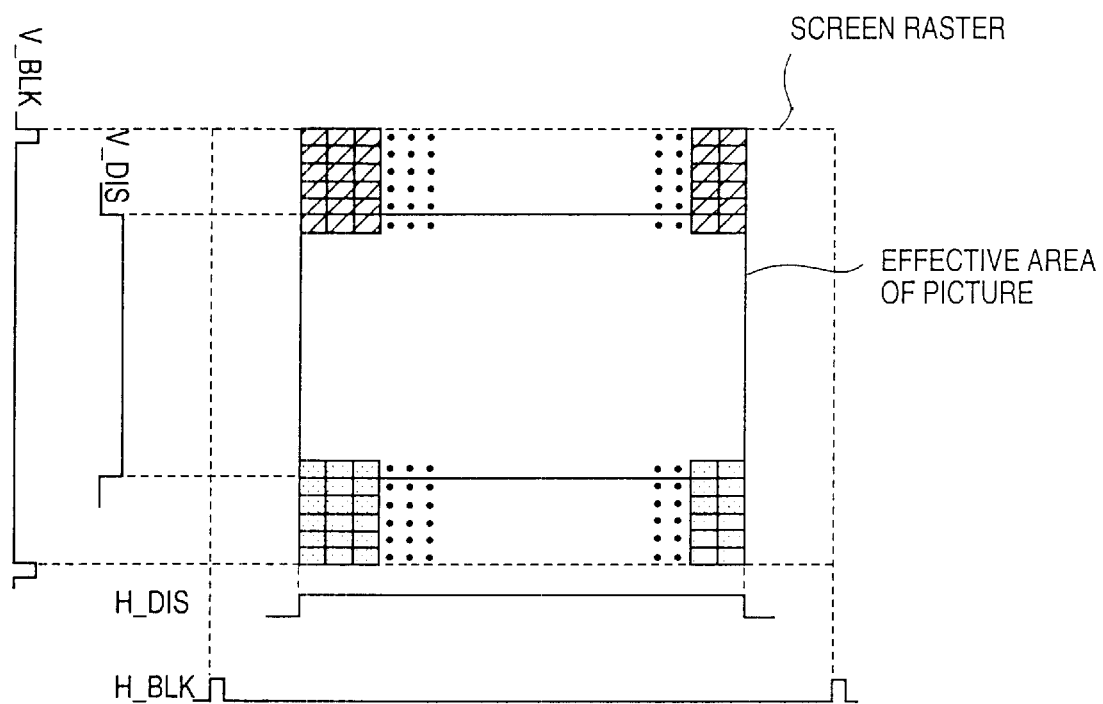
FIG. 34 is an explanatory view showing schematically on a screen a result of the operation of the address control circuit 19A shown in FIGS. 32 and 33.

FIG. 34 is an explanatory view showing schematically such a state on the screen. From the upper edge of the screen raster to the upper edge of the effective area of picture, and from the lower edge of the effective area of picture to the lower edge of the screen raster, the same and equal convergence correction is performed in their respective vertical directions. Accordingly, the convergence correction signal does not vary on the upper edge and lower edge of the picture display area in the state of under scan. As a result, it is possible to prevent the disorder in picture due to sudden variation of the convergence correction signal.

Though an example in which the convergence correction is varied before and after the first transition of the vertical blanking pulse is described in this example 7, it is also preferable that the convergence correction is varied at other timing, for example, before and after the last transition of the vertical blanking pulse.

EXAMPLE 8

Described in this example is a display device capable of easily storing correction data in the memory 6.

Figure 35:
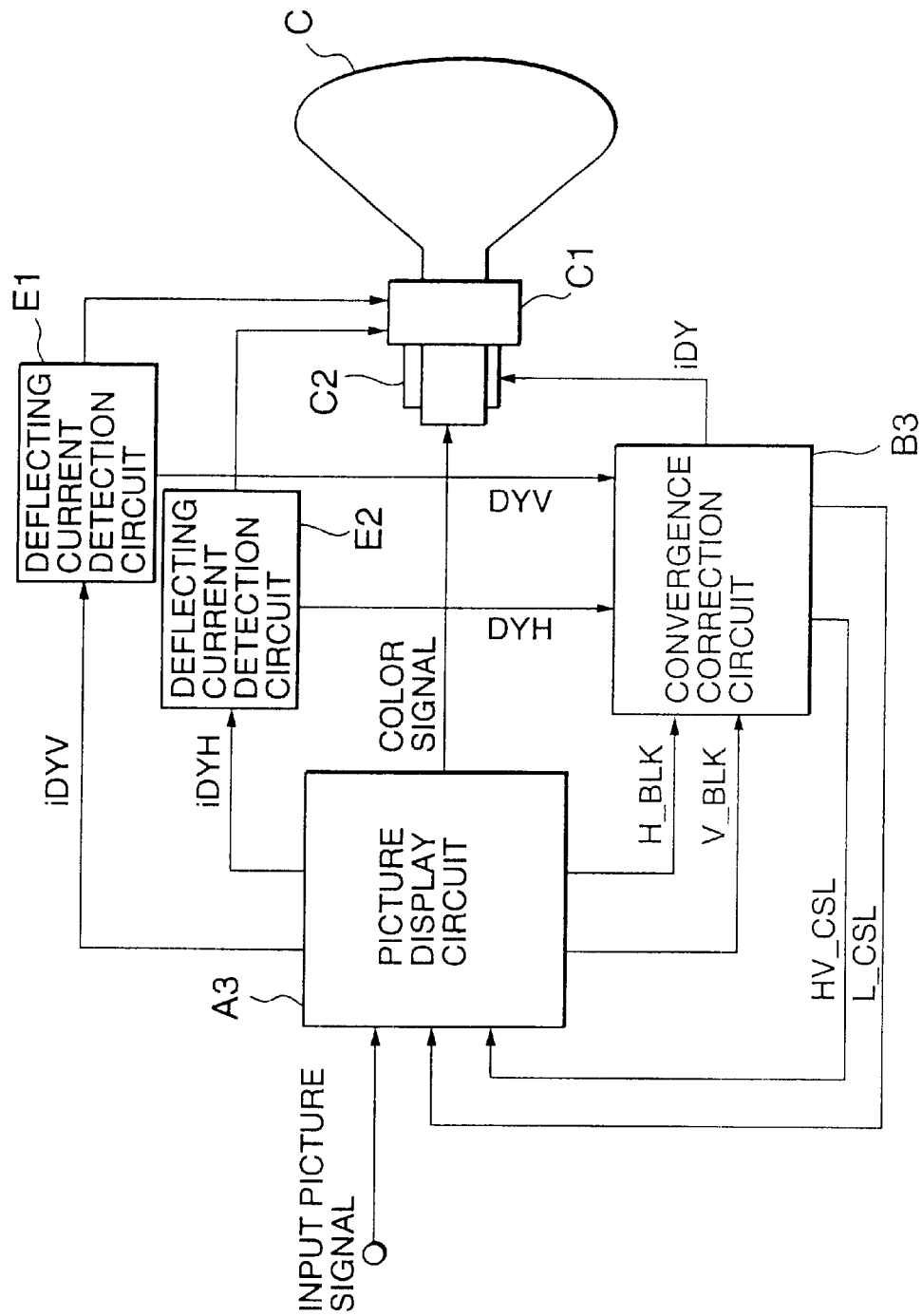
FIG. 35 is a diagram showing an example of an arrangement of a display device according to example 8.

FIG. 35 is a diagram showing an example of an arrangement of the display device according to this example 8. This display device comprises the display device shown in FIG. 25 to which a picture display circuit A3 and a digital convergence correction circuit B4 different from those in FIG. 25 are added. A display area indication signal HV_CSL and a correction point indication pattern L_CSL outputted from the convergence correction circuit B4 are inputted to the picture display circuit A3. And the picture display circuit A3 displays a picture on a CRT (C) in accordance with any of the input picture signal, the display area indication signal HV_CSL or the correction point indication pattern L_CSL.

Figure 36:
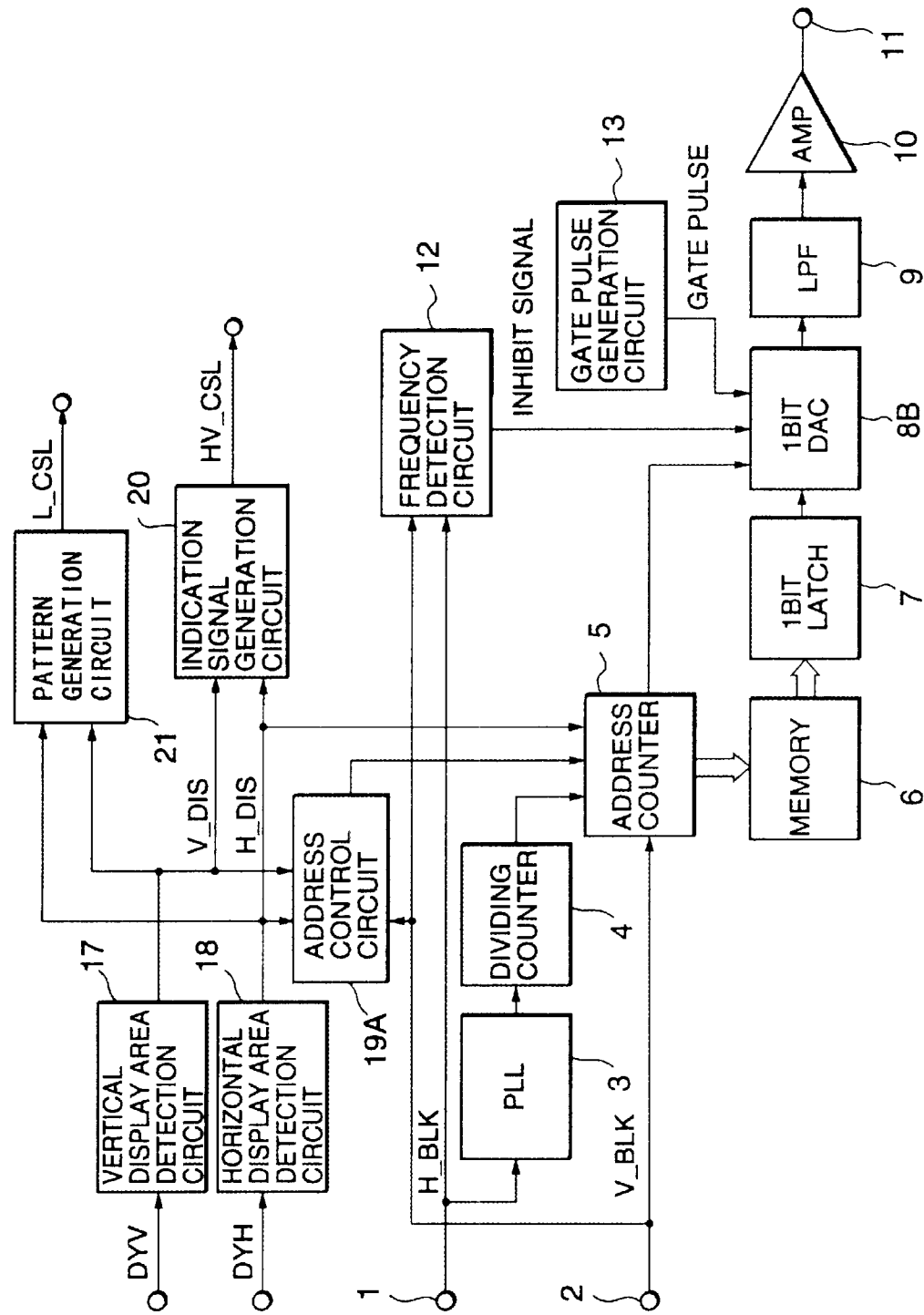
FIG. 36 is a block diagram showing an example of an arrangement of a convergence correction device B4 shown in FIG. 35.

FIG. 36 is a block diagram showing an example of an arrangement of the convergence correction device B4 shown in FIG. 35. This convergence correction circuit B4 comprises the convergence correction circuit shown in FIG. 31 to which a pattern generation circuit 21 is added. The pattern generation circuit 21 generates a correction point indication pattern L_CSL having a predetermined width in horizontal direction synchronously with the system clock, in accordance with the vertical display area detection signal V_DIS and the horizontal display area detection signal H_DIS. Position and width of each pattern can be optionally set by a microcomputer not shown.

Figure 37:
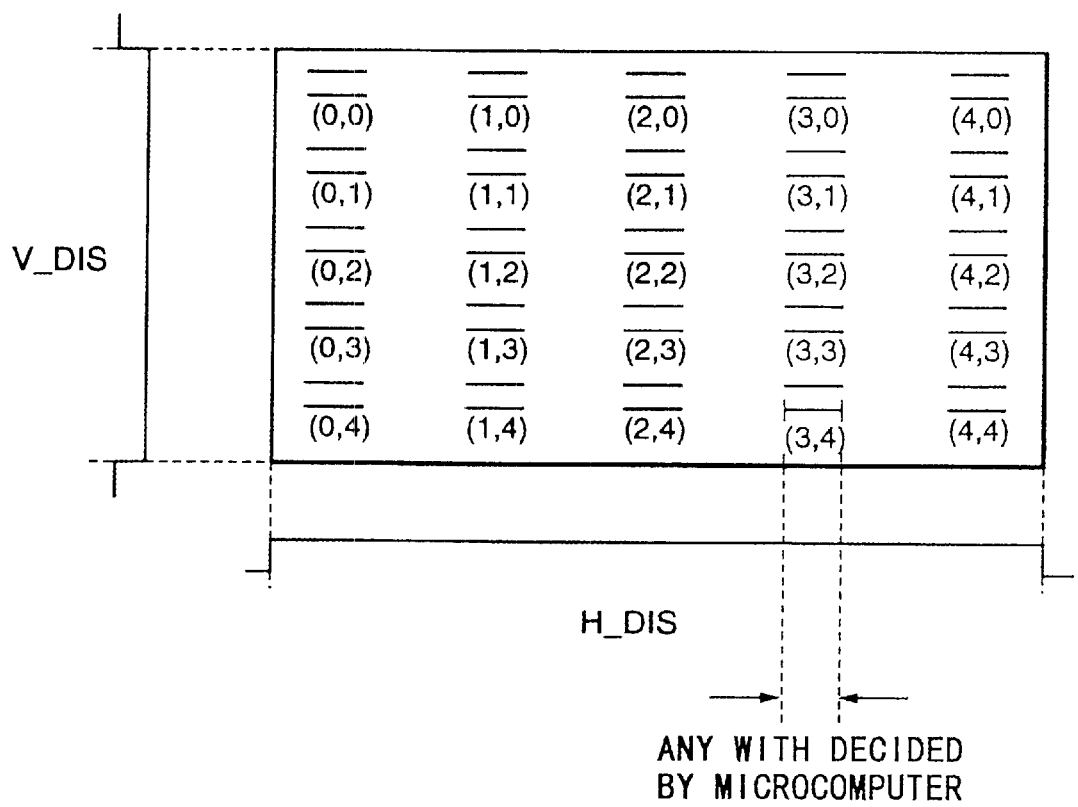
FIG. 37 is a diagram showing an example of a correction point indication pattern L_CSL displayed on a screen by a picture display circuit A3 together with the vertical display area detection signal V_DIS and the horizontal display area detection signal H_DIS.
Figure 38:
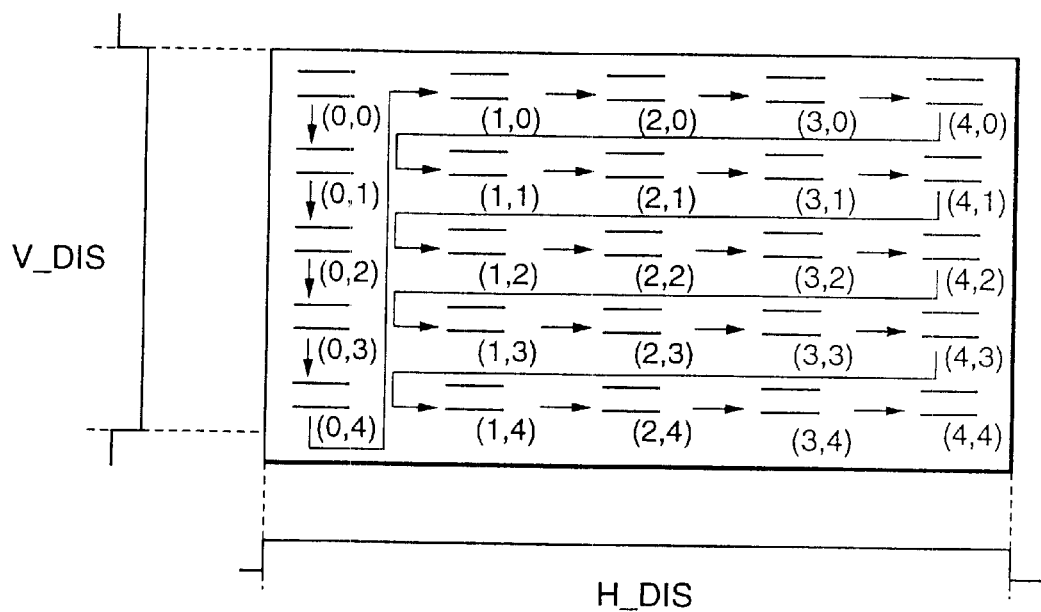
FIG. 38 is a diagram showing an example of an adjustment order with respect to each convergence correction point of 25 points shown in FIG. 37.

FIG. 37 is a diagram showing an example of the correction point indication pattern L_CSL displayed on the screen by the picture display circuit A3, together with the vertical display area detection signal V_DIS and the horizontal display area detection signal H_DIS. It is necessary to obtain the correction data with respect to the entire effective area of picture in the state of over scan. That is, the display area shown in the drawing is coincident to the effective area of picture. In this drawing, the effective area of picture is uniformly divided into 5×5=25 points, and supposing that left upper end is an origin (0, 0) of coordinates, the convergence correction points of 25 points are designated in order up to the coordinates (4, 4) of right lower end FIG. 38 is a diagram showing an example of an adjustment order with respect to each of the convergence correction point of 25 points shown in FIG. 37. First, an operator watching the correction point designation pattern on the screen, makes an adjustment of convergence amount, for example, in order of (0, 0)→(0, 1)→(0, 2)→(0, 3)→(0, 4)→(1, 0)→(2, 0)→(3, 0)→(4, 0)→(1, 1)→(2, 1)→(3, 1)→(4, 1)→(1, 2)→(2, 2)→(3, 2)→(4, 2)→(1, 3)→(2, 3)→(3, 3)→(4, 3)→(1, 4)→(2, 4)→(3, 4)→(4, 4). Thus, an optimum convergence correction amount is obtained. The obtained convergence correction amount is directly stored in the address which corresponds to the convergence correction point of the memory 6 as correction data.

Points other than these convergence correction points can be obtained by linear interpolation of the correction data in the mentioned convergence correction points. That is, an area surrounded by adjacent convergence correction of 4 points is divided into four equal parts. Then, for example, with respect to each convergence correction point located between the coordinates (0, 0) and the coordinates (0, 1), a convergence correction amount is obtained using the convergence correction amount in the coordinates (0, 0) and in the coordinates (0, 1). Then, with respect to each convergence correction point located between the coordinates (0, 0) and the coordinates (1, 0), a convergence correction amount is obtained using the convergence correction amount in the coordinates (0, 0) and in the coordinates (1, 0). At this time, even in the event of variation in scanning frequency, effective area of picture (picture size), etc., the vertical display area detection signal V_DIS and the horizontal display area detection signal H_DIS are coincident to the effective area of picture. Therefore, an optimum convergence correction amount can be obtained just by performing a linear interpolation using a time as a variable and utilizing a correlation between the position on a screen the vertical deflecting current iDYV and the horizontal deflecting current iDYH.

In this manner, as the operation of interpolation is performed using the vertical deflecting current iDYV and the horizontal deflecting current iDYH corresponding to the picture area as a time parameter, it is possible to secure a precision in convergence correction without influence by the variation in scanning frequency and picture size.

Though an example in which the effective area of picture is uniformly divided into 5×5=25 points is shown in FIG. 38, it is impossible to improve the precision in convergence correction all the more by increasing the correction point designation pattern, for example, to 5×9=45 points or to 9×9=81 points.

EXAMPLE 9

Described in this example is a display device comprising a digital convergence correction device for storing and holding a convergence correction amount with respect to each convergence correction point as correction data. The display device is capable of performing a desired convergence correction even in the event of variation in the relation of correspondence between the screen raster and the effective area of picture.

Figure 39:
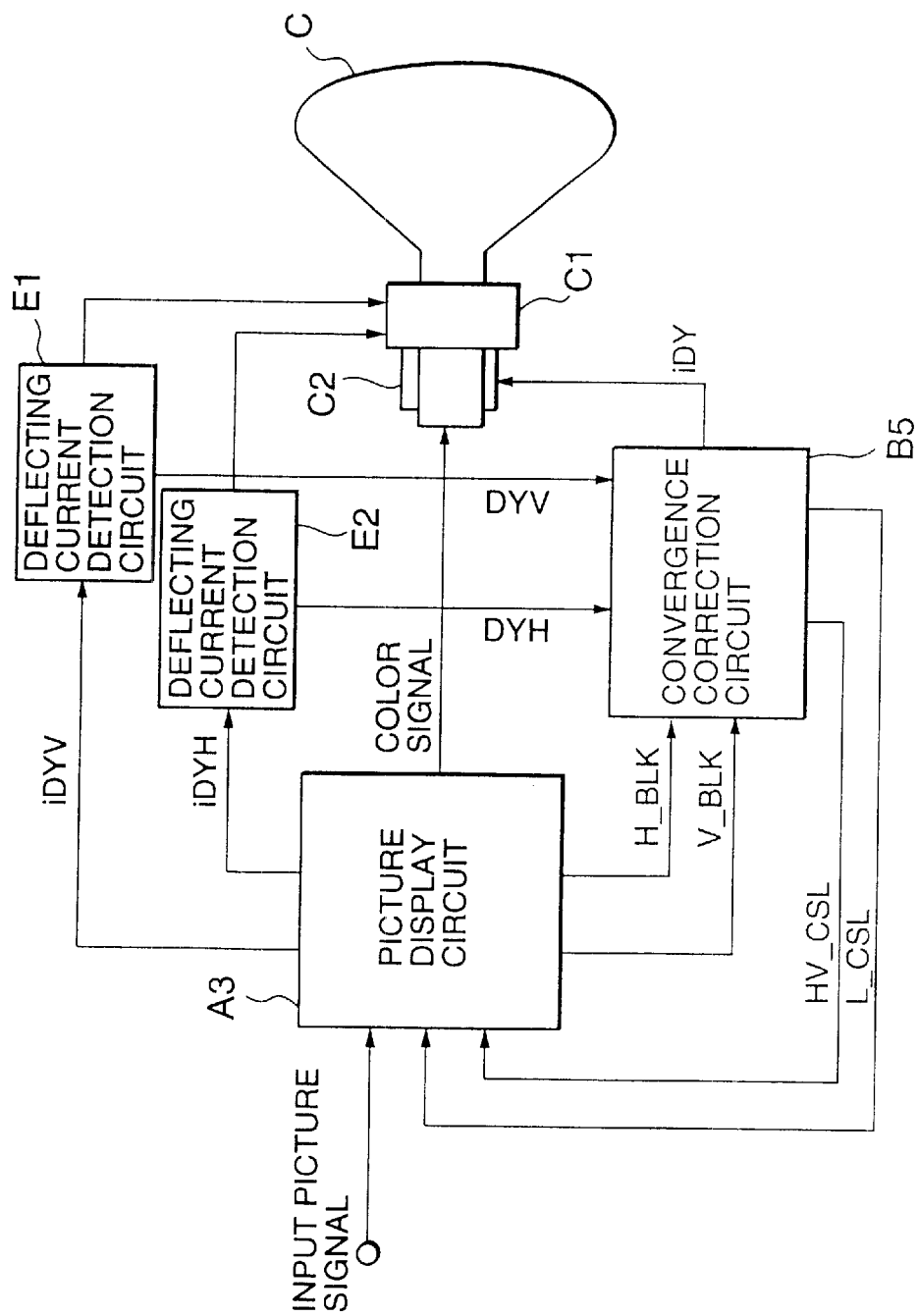
FIG. 39 is a block diagram showing schematically an example of an arrangement of a display device according to example 9.

FIG. 39 is a block diagram showing schematically an example of an arrangement of the display device according to this example 9. This display device comprises the display device shown in FIG. 35 to which a digital convergence correction circuit B5 different form that in FIG. 35 is added.

Figure 40:
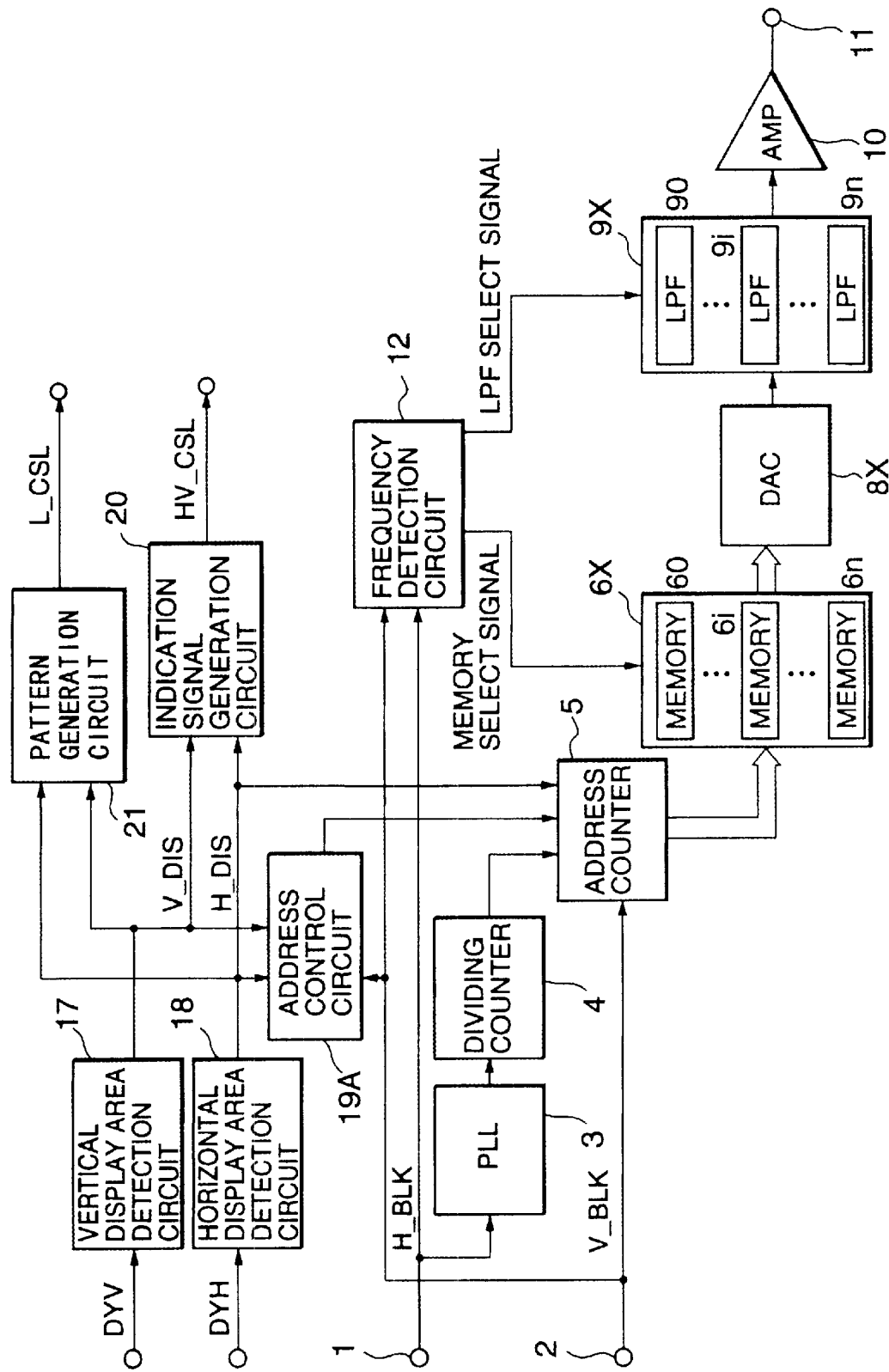
FIG. 40 is a block diagram showing an example of an arrangement of a convergence correction device B5 shown in FIG. 39.

FIG. 40 is a block diagram showing an example of an arrangement of the digital convergence correction device B5 shown in FIG. 39. This convergence correction circuit comprises the convergence correction circuit shown in FIG. 36 to which a different memory section 6X, a DAC (8X) and a low-pass filter section 9X are added, without comprising a 1 bit latch and a gate pulse generation circuit.

The memory section 6 comprises memories 60 to 6n corresponding to different frequencies, and the low-pass filter section 9X comprises low-pass filters 90 to 9n corresponding to the different frequencies. The frequency detection circuit 12 outputs a selection signal in accordance with the horizontal blanking pulse H_BLK and the vertical blanking pulse V_BLK, selects a memory 6i of those forming the memory section 6X, and selects a low-pass filter 9i of those forming the low-pass filter section 9X. The DAC (8X) is a digital/analog converter circuit for converting the correction data to an analog signal, and comprises a DAC having a width of 8 bit if width of the correction data is 8 bits. In accordance with the address read out from the address counter 5, the correction data are read out from the selected memory 6i synchronously with screen scanning, and the read out correction data are converted to an analog signal by the DAC (8X). This analog signal is smoothed, and a convergence correction signal iDY is generated by the low-pass filter 9i corresponding to the scanning frequency of the input picture signal.

This convergence correction device comprises a vertical display area detection circuit 17, a horizontal display area detection circuit 18, and an address control circuit 19A. As a result, in the same manner as in example 4, the address counter 5 generates an address corresponding to each convergence correction point located in the effective area of picture in the event of over scan. In the event of under scan, an address corresponding to each convergence correction point located in the screen raster is generated. Accordingly, a convergence correction corresponding to the relation between the screen raster and the effective area of picture can be performed at all times.

On the other hand, in the event of variation in scanning frequency, it is possible to cope with the variation by selecting the memory 6i corresponding to the scanning frequency and the low-pass filter 9i corresponding to the scanning frequency. As a result, even if the relation between the screen raster and the effective area of picture varies due to variation in scanning frequency, it is possible to perform a desired convergence correction. Further, not only in the event of variation in the relation between the screen raster and the effective area of picture due to the variation in scanning frequency but also in the event of the same scanning frequency, it is possible to perform a desired convergence correction when the relation between the screen raster and the effective area of picture is different.

In the same manner as in example 5, by providing an indication signal generation circuit 21, it is possible to output a display area indication signal HV_CSL in accordance with the vertical display area detection signal V_DIS and the horizontal display area detection signal H_DIS. As a result, it is possible to display a picture of rectangular frame showing a peripheral edge portion of the display area on the screen and to obtain easily data of the vertical effective picture area signal V_DIS0 and data of the horizontal effective picture area signal H_DIS0.

Further, in the same manner as in example 7, by providing the address control circuit 19A, in the event of under scan, it is possible to prevent a disorder in display picture caused by sudden variation in convergence correction signal on the upper edge and lower edge of the screen raster.

What is claimed is:

1. A digital convergence correction device comprising:
   a memory for storing correction data for each convergence correction point that corresponds to a position on a screen in a relation of 1 to 1, and an address counter for generating a read address with respect to the memory synchronously with screen scanning; and in which a convergence correction signal is generated in accordance with the correction data read out;

said digital convergence correction device further comprising:
   a vertical display area detection circuit for generating and outputting a vertical display area detection signal that corresponds to a position in a vertical direction of a picture display area on the screen in accordance with a vertical deflecting current; and
   an address control circuit for controlling said address counter in accordance with said vertical display area detection signal.

2. A The digital convergence correction device according to claim 1, wherein the vertical display area detection circuit comprises a comparator for comparing a current value of the vertical deflecting current with a predetermined comparison level,
   wherein in the event of under scan, a level that corresponds to positions of two ends in vertical direction of a screen raster is used as a comparison level, and in the event of over scan, a level that corresponds to positions of two ends in vertical direction of an effective area of picture is used as a comparison level.

3. The digital convergence correction device according to claim 2, wherein the address circuit stores the vertical display area detection signal in the event of over scan as a signal of vertical effective area of picture, and in the event of under scan, a time lag between a timing of variation in the signal of vertical effective area of picture and a timing of variation in the vertical display area detection signal is obtained, and the time lag is converted to a read address and outputted to the address counter.

4. The digital convergence correction circuit according to claim 1, further comprising an indication signal generation circuit for outputting a display area indication signal that indicates a picture display area in a vertical direction on the screen in accordance with the vertical display area detection signal.

5. A display device comprising: said digital convergence correction device according to claim 4, and a picture display circuit for displaying a picture in accordance with the display area indication signal from said digital convergence correction circuit.

6. The digital convergence correction device according to claim 1, wherein in the event of over scan, the address control circuit outputs a read address during a first horizontal scanning period to the address counter for each horizontal scanning period, from a time of variation in a vertical synchronizing signal up to a time of variation in the vertical display area detection signal, in accordance with the vertical synchronizing signal and the vertical display area detection signal.

7. The digital convergence correction device according to claim 1, wherein in the event of over scan, the address control circuit outputs a read address during a final horizontal scanning period to the address counter for each horizontal scanning period, from a time of variation in the vertical synchronizing signal up to a time of variation in the vertical display area detection signal, in accordance with the vertical synchronizing signal and the vertical display area detection signal.

8. A display device comprising said digital convergence correction device according to claim 1.

9. A digital convergence correction device comprising:
   a memory for storing correction data for each convergence correction point that corresponds to a position on a screen in a relation of 1 to 1, and an address counter for generating a read address with respect to the memory synchronously with screen scanning; and in which a convergence correction signal is generated in accordance with the correction data read out;
   a horizontal display area detection circuit for generating and outputting a horizontal display area detection signal that corresponds to a position in horizontal direction of a picture display area on the screen in accordance with a horizontal deflecting current; and
   an address control circuit for controlling an address counter in accordance with the horizontal display area detection signal.

10. The digital convergence correction device according to claim 9, wherein the horizontal display area detection circuit comprises a comparator for comparing a current value of the horizontal deflecting current with a predetermined comparison level,
   wherein in the event of under scan, a level that corresponds to positions of two ends in horizontal direction of the screen raster is used as a comparison level, and in the event of over scan, a level that corresponds to positions of two ends in horizontal direction of the effective area of picture is used as a comparison level.

11. The digital convergence correction device according to claim 9, wherein the address circuit stores the horizontal display area detection signal in the event of over scan as a signal of horizontal effective area of picture, and in the event of under scan, a time lag between a timing of variation in the signal of horizontal effective area of picture and a timing of variation in the horizontal display area detection signal is obtained, and the time lag is converted to a read address and outputted to the address counter.

12. A display device comprising said digital convergence correction device according to claim 9.

13. The digital convergence correction circuit according to according to claim 9, further comprising an indication signal generation circuit for outputting a display area indication signal that indicates a picture display area in horizontal direction on the screen in accordance with the horizontal display area detection signal.

14. A display device comprising said digital convergence correction device according to claim 13, and a picture display circuit for displaying a picture in accordance with the display area indication signal from said digital convergence correction circuit.

15. A digital convergence correction device comprising: a memory for storing correction data for each convergence correction point that corresponds to a position on a screen in a relation of 1 to 1, and an address counter for generating a read address with respect to the memory synchronously with screen scanning; and in which a convergence correction signal is generated in accordance with the correction data read out;
   a vertical display area detection circuit for generating and outputting a vertical display area detection signal that corresponds to a position in vertical direction of a picture display area on the screen in accordance with a vertical deflecting current;
   a horizontal display area detection circuit for generating and outputting a horizontal display area detection signal that corresponds to a position in horizontal direction of a picture display area on the screen in accordance with a horizontal deflecting current; and
   an address control circuit for controlling an address counter in accordance with the vertical display area detection signal.

16. The digital convergence correction device according to claim 15, wherein the vertical display area detection circuit comprises a comparator for comparing a current value of the vertical deflecting current with a predetermined comparison level, and in the event of under scan, a level that corresponds to positions of two ends in vertical direction of the screen raster is used as a comparison level, and in the event of over scan, a level that corresponds to positions of two ends in vertical direction of the effective area of picture is used as a comparison level; and
   the horizontal display area detection circuit comprises a comparator for comparing a current value of the horizontal deflecting current with a predetermined comparison level, and in the event of under scan, a level that corresponds to positions of two ends in horizontal direction of the screen raster is used as a comparison level, and in the event of over scan, a level that corresponds to positions of two ends in horizontal direction of the effective area of picture is used as a comparison level.

17. The digital convergence correction device according to claim 15, wherein the address circuit stores preliminarily the vertical display area detection signal in the event of over scan as a signal of vertical effective area of picture and the address circuit stores preliminarily the horizontal display area detection signal in the event of over scan as a signal of horizontal effective area of picture, and
   in the event of under scan, a time lag between a timing of variation in the signal of vertical effective area of picture and a timing of variation in the vertical display area detection signal is obtained and a time lag between a timing of variation in the signal of horizontal effective area of picture.and a timing of variation in the horizontal display area detection signal is obtained, and the time lags are converted to a read address and outputted to the address counter.

18. A display device comprising said digital convergence correction device according to claim 15.

19. The digital convergence correction circuit according to claim 15 further comprising an indication signal generation circuit for outputting a display area indication signal that indicates a picture display area in vertical direction on the screen in accordance with the vertical display area detection signal and the horizontal display area detection signal.

20. A display device comprising said digital convergence correction device according to claim 19, and a picture display circuit for displaying a picture in accordance with the display area indication signal from the digital convergence correction circuit.

* * * * *